United States Patent [19]

Luciw et al.

[11] Patent Number: 5,390,281
[45] Date of Patent: Feb. 14, 1995

[54] METHOD AND APPARATUS FOR DEDUCING USER INTENT AND PROVIDING COMPUTER IMPLEMENTED SERVICES

[75] Inventors: William W. Luciw, Morgan Hill; Stephen P. Capps, San Carlos; Lawrence G. Tesler, Portola Valley, all of Calif.

[73] Assignee: Apple Computer, Inc., Cupertino, Calif.

[21] Appl. No.: 889,225

[22] Filed: May 27, 1992

[51] Int. Cl.$^6$ .................. G06F 15/38; G06F 15/40; G06F 3/023
[52] U.S. Cl. ...................... 395/12; 395/51; 395/62; 395/908; 395/909; 364/419.08
[58] Field of Search ............... 340/706; 358/400, 402, 358/407; 364/419, 705.07, 705.08, 709.01, 709.09, 709.11, 419.08; 395/10, 12, 50, 51, 140, 141, 143, 62, 903, 904, 905, 906, 907, 908, 909, 916, 917

[56] References Cited

U.S. PATENT DOCUMENTS

| | | | |
|---|---|---|---|
| 4,670,848 | 6/1987 | Schramm | 395/60 |
| 4,736,296 | 4/1988 | Katayama et al. | 364/419 |
| 4,875,187 | 10/1989 | Smith | 395/141 |
| 4,918,723 | 4/1990 | Iggulden et al. | 379/100 |
| 4,945,504 | 7/1990 | Nakama et al. | 364/789.11 |
| 4,953,106 | 8/1990 | Gansner et al. | 395/160 |
| 4,974,191 | 11/1990 | Amirghodsi et al. | 395/275 |
| 5,068,802 | 11/1991 | Miyashita et al. | 395/133 |
| 5,091,790 | 2/1992 | Silverberg | 358/434 |
| 5,103,498 | 4/1992 | Lanier et al. | 395/68 |
| 5,109,509 | 4/1992 | Katayama et al. | 395/600 |
| 5,123,103 | 6/1992 | Ohtaki et al. | 395/600 |

FOREIGN PATENT DOCUMENTS

| | | | |
|---|---|---|---|
| 0441089A2 | 8/1991 | European Pat. Off. | G06F 3/023 |
| 1130291 | 5/1989 | Japan | G06K 9/03 |

OTHER PUBLICATIONS

Roh et al.; *Artificial Intelligence;* 1991 2nd ed.; McGraw-Hill, Inc.; pp. 41–44, 302, 303.
*Microsoft Windows User's Guide for the Windows Graphical Environment;* version 3.0; Microsoft Corporation; 1985–1990; pp. 1–75, 99–142, 355–387.
*Microsoft MSDOS Operating System User's Guide;* ©1982, 1983; pp. 4–1 to 4–16 and 5–1 to 5–19.
Wilensky et al.; "Talking to UNIX in English"; *Communications of the ACM;* Jun. 1984; V27 N6; pp. 574–593.
Tello; "Natural Language Systems"; *Mastering AI Tools and Techniques;* ©1988.
Wiener; "Three Weeks that Did Not Reorganize My Life"; *U.S. News & World Report;* v 106 p. 76(2), Feb. 1989; Dialog 07010300.

(List continued on next page.)

*Primary Examiner*—Roy N. Envall, Jr.
*Assistant Examiner*—Stephen R. Tkacs
*Attorney, Agent, or Firm*—Hickman & Beyer

[57] ABSTRACT

A method for deducing user intent and providing computer implemented services characterized by the steps of: a) noticing a significant new event occurring within the computer system; b) deducing an intent from the significant new event and from the context in which the new event occurred; and c) providing a service based upon the new event and its context. Significant events are those which the computer might be able to assist a user, and can be determined by matching the event into a database of recognizable events to make a significant observation. The deduction step takes a delimited set of significant observations and attempts to match the set against a number of intent templates. If there are multiple matches to the intent templates, the matches are ranked and a best guess is made to determine a deduced intent. Service is provided fulfilling all preconditions of a plan associated with the deduced intent, and by sequentially executing the steps of the plan. The apparatus of the present invention implements the method on a pen-based computer system.

10 Claims, 18 Drawing Sheets

OTHER PUBLICATIONS

Dickinson et al.; "Palmtops: Tiny Containers for All Your Data"; *PC Magazine;* v 9 p. 218(3); Mar. 1990; Dialog 08157664.

Bajarin; "With Low End Launched, Apple Turns to Portable Future"; *PC Week;* v 7 p. 153(1); Oct. 1990; DIALOG 09532321.

DIAGRAMMAKER; 1989; Action Software; DIALOG 00012010 Corporate Ladder; 1991; Bloc Publishing Corp.; DIALOG 08014820.

Diagram–Master; 1987; Ashton–Tate; DIALOG 00011735.

Org Plus Advanced; 1990; Banner Blue; DIALOG 00014777.

O'Connor, Rory J., "Apple Banking on Newton's Brain," San Jose Mercury News, Apr. 22, 1992.

Hendrix, Gary G. and Walter, Brett A., "The Intelligent Assistant: Technical Considerations Involved in Designing Q7A's Natural–language Interface," Byte Magazine, Dec. 1987, Issue 14/p. 251.

Edwards, John R., "Q&A: Integrated Software w/Macros and an Intelligent Assistant," Byte Magazine, Jan. 1986, v. 11, Issue 1, pp. 120–122.

Goldberg, Cheryl, "IBM Drawing Assistant: Graphics for the EGA" PC Magazine, Dec. 24, 1985, vol. 4, Issue 26, p. 255.

Garretson, R., "IBM Adds 'Drawing Assistant' Design Tool to Graphics Series," PC Week, Aug. 13, 1985, v. 2, Issue 32, p. 8.

Glinert–Stevens, Susan, "Microsoft Publisher: Desktop Wizardry" PC Sources, Feb. 1992, V. 3, Issue 2, p. 357.

Nilsson, B. A., "Microsoft Publisher is an Honorable Start for DTP Beginners," Computer Shopper, Feb. 1992, V. 12, Issue 2, p. 416.

Poor, Alfred, "Microsoft Publisher," PC Magazine, Nov. 26, 1991, V. 10, Issue 20, p. 40.

Rampe, Dan et al., Jan. 9, 1989 news release, Claris Corp. (Announced "SmartForm DEsigner" and SmartForm Assistant.).

Berry, Deanne et al., Apr. 10, 1990 news release, Symantec, (Announced new version of MORE(TM).

Elofson, G. et al., "Delegation Technologies: Environmental Scanning with Intelligent Agents," Jour. of Management Info. Systems, Summer 1991, V.8, issue 1, pp. 37–62.

Nadoli, Gajanana et al., "Intelligent Agents in the Simulation of Manufacturing Systems," Proceedings of the SCS Multiconference on AI and Simulation, 1989.

Sharif Heger et al., "KNOWBOT: an Adaptive Data Base Interface," Nuclear Science and Engineering, Feb. 1991, V. 107, No. 2, pp. 142–157.

Ohsawa, I. et al., "A Computational Model of an Intelligent Agent Who Talks with a Person," Research Reports on Information Sciences, Series C, Apr. 1989, No. 92, pp. 1–18.

Ratcliffe, Mitch et al., "Intelligent Agents take U.S. Bows," MacWeek, Mar. 2, 1992, V. 6, No. 9, p. 1.

Figure 4d

SHAPE LOOK-UP TABLE

| SHAPE | INSTANCE |
|---|---|
| △ | <TRIANGLE> |
| □ | <SQUARE> |
| ✕ | <CROSS> |
| ○ | <CIRCLE> |
| ⋮ | ⋮ |

OPPORTUNISTIC LOOK-UP TABLE

| | |
|---|---|
| ⋮ | ⋮ |
| <INCOMING FAX> | [FAX PLAN TEMPLATE] |
| <INCOMING MAIL> | [MAIL PLAN TEMPLATE] |
| ⋮ | ⋮ |

— 91

WORD ACTIVATED TASK TEMPLATE

METHOD AND APPARATUS FOR DEDUCING USER INTENT AND PROVIDING COMPUTER IMPLEMENTED SERVICES

BACKGROUND OF THE INVENTION

The present invention relates generally to computer systems, and more particularly to methods for providing computerized assistance to users of computer systems.

Computer systems have evolved over the years to provide substantial levels of user assistance. On such form of assistance is the help function available in many operating systems and application programs. For example, release 7.0 of the Macintosh operating system of Apple Computer, Inc. provides context sensitive "balloon help" where a user can learn more about an object represented on a computer screen by simply pointing to the object. Microsoft Word 5.0 from Microsoft, Inc. provides a help menu which allows a user to select a help topic. Other systems, such as dbase IV from Borland International, will ask users if they need help if it appears that they need help.

Conventional help functions are useful adjuncts to system and application software. They provide a convenient access to helpful information without requiting a user to study a reference manual. However, such help functions tend to be quite limited. They typically are only useful for a limited range of topics, and users must often know the right questions to ask to access the information. Furthermore, conventional help functions are merely passive providers of information and do not aid a user in accomplishing a desired task.

Another form of computerized assistance are the utilities known as "macros" which can provide user requested services. Macros often have a "record" function which allows a series of keystrokes to be recorded for subsequent playback. By using the record function, a frequently used sequence of commands can be executed by evoking the macro.

A powerful feature of many macro programs is the ability to program macro functions including loops and conditionals. This permits the macro to adapt to user inputs and the system environment to flexibly perform automated tasks. While macros are powerful tools, their capabilities tend to be limited and they must be evoked by the user.

Both help and macro functions fall short of providing intelligent or "deductive" assistance to computer users. The help function is essentially just a convenient way for a user to access reference information or information concerning system status. The macro function is often no more than an automated playback of a string of commands. Truly deductive assistance would anticipate a user's needs and intentions and satisfy those needs and intentions with little or no user input.

To be truly useful, deductive assistance should be fully integrated throughout a computer system's operating and application programs. No such deductive assistance process has heretofore been known. One reason for this is that most general purpose computers do not have a high degree of integration between various application programs and between the application programs and the operating system. Therefore, activity in one application program is unlikely to have an impact upon or modify another application program, limiting the range of useful activities that a deductive assistant could provide. Nonetheless, deductive assistance would be useful in the general computer environment if it were available.

A relatively new type of computer which is well suited for deductive assistance is the pen-based computer system. A pen-based computer system is typically a small, hand-held computer where the primary method for inputting data includes a "pen" or stylus. A pen-based computer system is commonly housed in a relatively flat enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

Besides serving as a notepad, pen-based computers can provide a number of useful functions, such as serving as an address book, an appointment calendar, a to-do list, etc. These functions can be tightly integrated with the operating system of the computer, permitting information input into one function to impact upon another function. In such an environment, deductive assistance would be a valuable addition to the functionality and value of the computer system.

SUMMARY OF THE INVENTION

The present invention provides deductive assistance to a user of a computer system. More particularly, a method for deducing user intent and providing computer implemented services in accordance with the present invention includes the steps of: a) noticing a significant new event occurring within the computer system; b) deducing an intent from the significant new event and from the context in which the new event occurred; and c) providing a service based upon the new event and its context. The present invention therefore differs from other forms of computer based assistance by recognizing meanings in events, deducing probable intent, and taking action based upon the deduced intent.

Preferably, the step of noticing a significant new event is accomplished by comparing every new event with a database of recognizable significant events. If there is a match into the database, a significant observation has been made. A delimiter value (such as the time and place at which the event occurred) is recorded along with the significant observation.

The step of deducing user intent is accomplished by first recognizing a possible intent from the significant observation, and then making a best-guess hypothesis as to the actual intent. The first part of the deduction step considers the context in which the significant observation occurred. This is preferably accomplished by collecting a number of significant observations into a set. The significant observation set is compared to a plurality of intent templates and, if there is at least one match, the significant observation set becomes a meaningful observation, i.e. the deductive assistant has deduced a possible intent. The second part of the deduction step prioritizes all of the possible intents, and chooses a best-guess hypothesis from the possible intent with the highest score.

The step of providing services preferably has three parts: a) preparing to execute; b) determining that the deduced intent should be executed; and c) actually executing the deduced intent. In preparing to execute, the process identifies missing preconditions and attempts to resolve them. To determine whether the deduced intent should be executed, the process makes sure that all preconditions have been met and that the confidence level is above a threshold value. The actual execution of the deduced intent involves the sequential execution of a plan associated with the deduced intent.

A preferred apparatus in accordance with the present invention implements the deductive assistant on a pen-based computer system.

Because the deductive assistant is integrated into virtually every aspect of the computer system, it is always monitoring system events regardless of which application is being used. It can therefore provide powerful and almost transparent assistance to a computer user, making the computer easier and friendlier to use.

These and other advantages of the present invention will become apparent to those skilled in the art upon a reading of the following specification of the invention and a study of the several figures of the drawing.

BRIEF DESCRIPTION OF THE DRAWINGS

FIG. 4d illustrates a shape look-up table;

FIG. 4e illustrates an opportunistic look-up table;

DETAILED DESCRIPTION OF THE PREFERRED EMBODIMENTS

Figure 1:
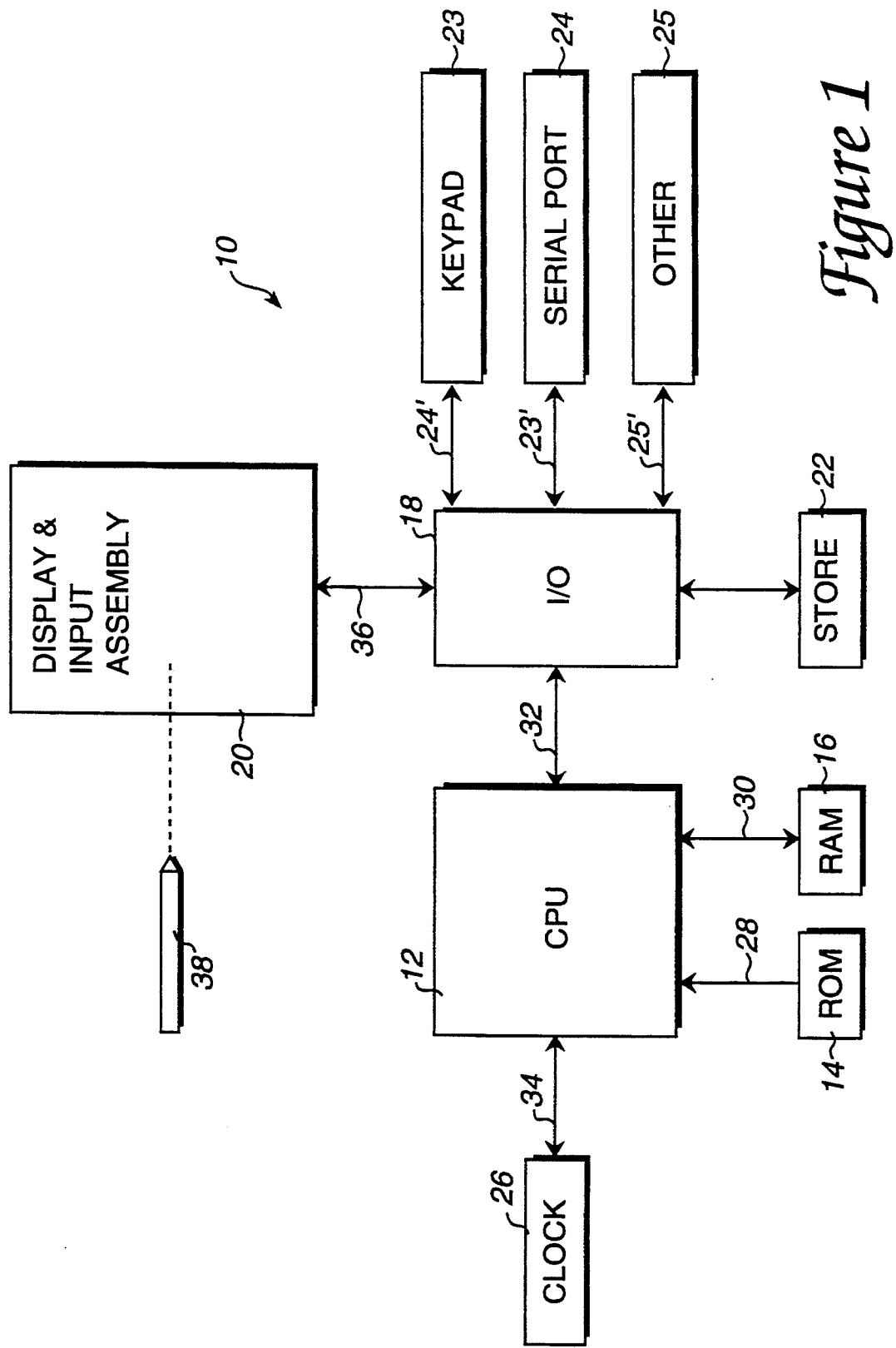
FIG. 1 is a block diagram of a pen-based computer system in accordance with the present invention.

In FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or non-volatile memory such as flash memory, an array of input buttons in a keypad 23, a serial port 24, an "other" I/O port 25, and a clock 26. I/O input port 25 can be an infrared (IR) port permitting the system 10 to communicate with other data processing systems by IR transmission.

The CPU 12 is preferably a commercially-available, single chip microprocessor. While CPU 12 can be a complex instruction set computer (CISC) chip, it is preferable that CPU 12 be a low power reduced instruction set computer (RISC) chip having a high performance to power ratio. CPU 12 is coupled to ROM 14 by a uni-directional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices, and to the clock 26 by a uni-directional data line 34.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 23, serial port 24, and I/O port 25. Keypad 23, serial port 24, and other port 25 are coupled to I/O circuitry 18 by data busses 23', 24', and, 25', respectively.

Clock 26 provides a series of clock pulses and is typically coupled to an interrupt port of CPU 12 by the data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position-sensitive membranes are also readily available on the commercial market. Combination display assemblies such as display assembly 20 which include both the LCD and the input membrane are available on the open market from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen. Therefore, as used herein, the terms "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of ROM 14 and RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, or non-volatile memory such as flash memory or battery-backed RAM.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. The CPU 12 then processes the data under control of an operating system and possibly an application program stored in ROM 14 and/or RAM 16. The CPU 12 next produces data which is output to the display assembly 20 to produce appropriate images on its screen.

The aforementioned process produces the illusion that the stylus 38 has an "ink" which appears on the screen of the display assembly 20. Therefore, as used herein, the terms "inking" and "ink" will refer to the process and the result, respectively, of displaying a line or other indicia on the screen of display assembly 20 in response to the movement of stylus 38 on the screen.

Figure 2:
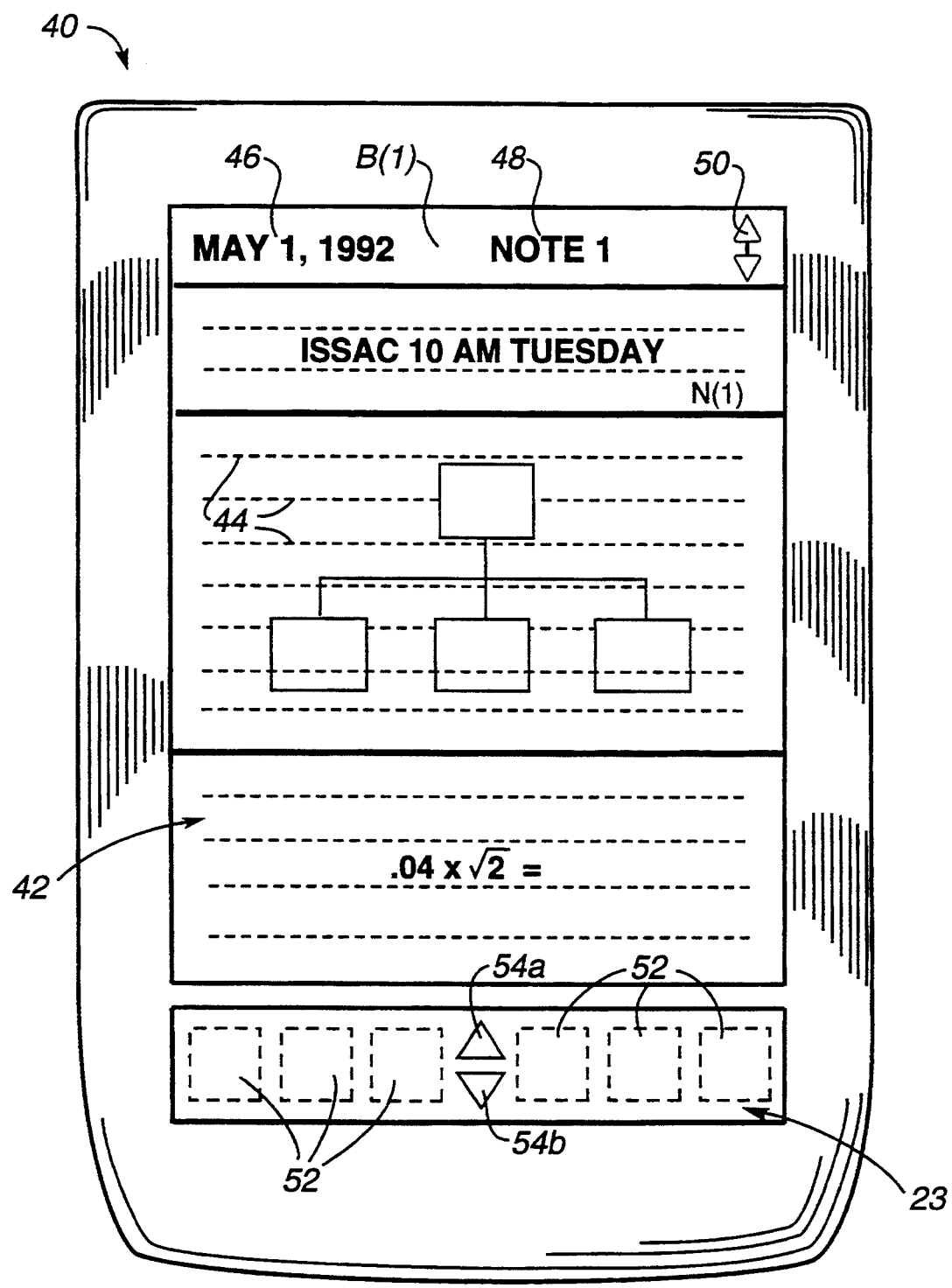
FIG. 2 is a top plan view of the pen-based computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 23.

Upon power-up, pen-based computer system 10 preferably displays on screen 42 an initial note area N(1) including a header bar B(1) and a number of guidelines 44. The header bar B(1) preferably includes the date of creation 46 of the note N(1), a note number 48, and a sizing "button" 50. The optional guidelines 44 aid a user in entering text, graphics, and data into the pen-based computer system 10. Of course, other initial screen layouts are also possible.

A method for deducing user intent and providing computer implemented services (i.e. deductive assistance) of the present invention is a process that is continually running on the system 10, i.e. the method observes events continuously and globally throughout the system. The method can be considered to be an extension of the operating system which continuously notices user and system behavior, interprets that behavior, guesses what, if anything, should be done based upon the interpretation, performs services indicated by the interpretation, and adapts its world model based upon the user's and its own actions.

The method of the present invention is an augmentation, not a replacement, of a conventional user interface. Its purpose is to reduce the perceived complexity of the computer system 10. As such, the method of the present invention works intimately with many aspects of the operating system (such as the user interface) and with application programs (such as a word processing or faxing program). For example, a method for deducing user intent and providing computer implemented services in accordance with the present invention preferably closely cooperates with the recognition architecture of the operating system which recognizes higher-level meanings from strokes made by the stylus 38 on the screen 42 of display assembly 20. While the method of the present invention is not limited to any one recognition architecture, it is particularly well adapted to operate with the recognition architecture described in co-pending U.S. patent application Ser. No. 07/889,216, filed May 27, 1992 on behalf of Beernink et al., entitled "Recognition Architecture and Interface", and assigned in common with the present application to Apple Computer, Inc., the disclosure of which is hereby incorporated by reference in its entirety.

Figure 3:
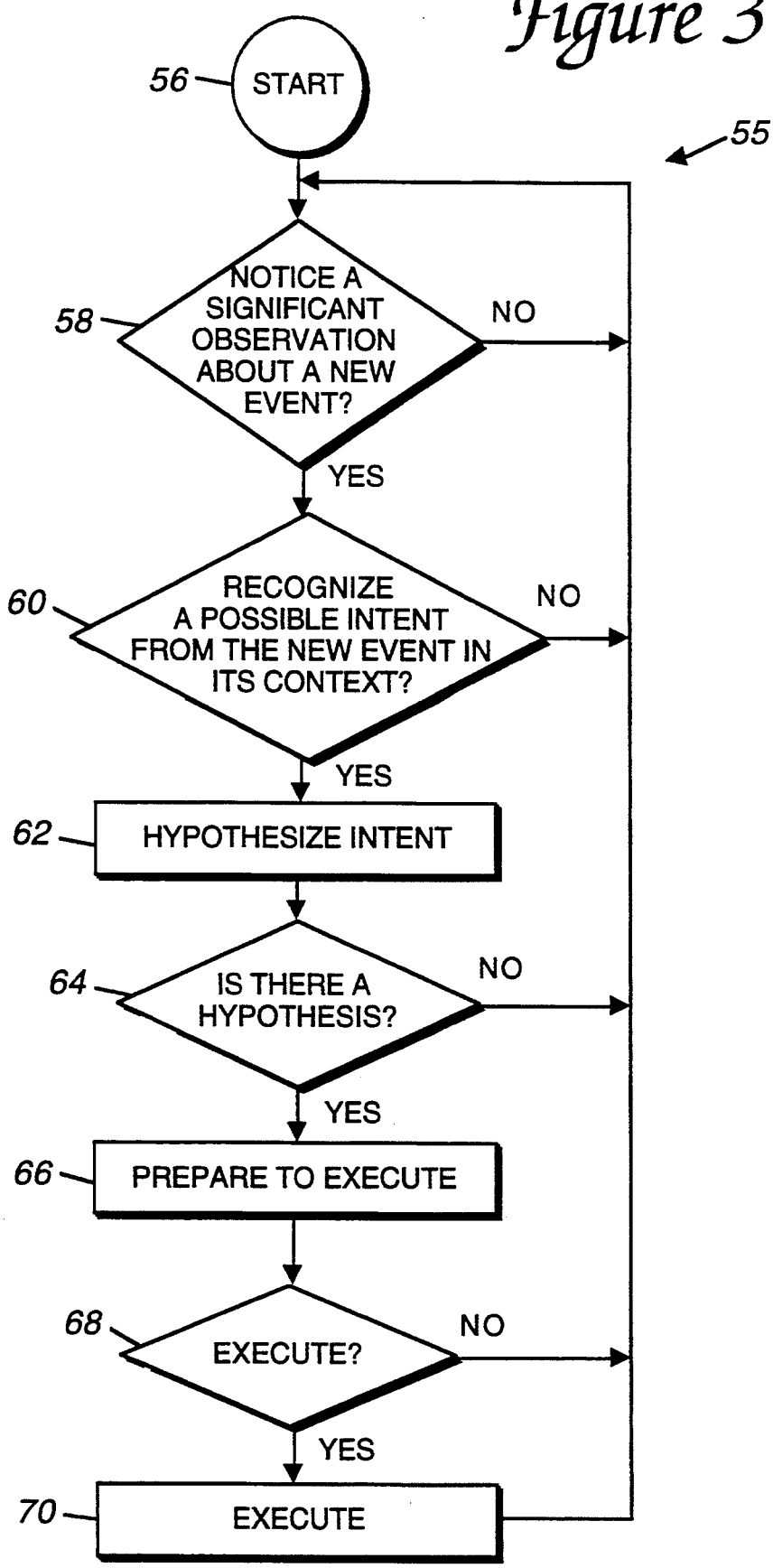
FIG. 3 is a flow diagram of a method for deducing user intent and providing computer implemented services in accordance with the present invention.

A method or process 55 for deducing user intent and providing computer implemented services in accordance with the present invention is shown in FIG. 3. The process begins at 56 on power-up of the computer system 10 and runs concurrently with other system functions. In a step 58, the process either notices or does not notice a significant observation about a new event. In the computer system, events occur continuously, some of which are significant to the process 55 and some of which are not. Examples of events include strokes made by the stylus 38 on the display assembly 20, words and phrases input either through serial port 24 or via stylus 38, clock data from clock 26, an incoming message alert on I/O port 25, etc. If the process 55 fails to make a significant observation about the new event, step 58 is repeated until a significant new event does occur.

As used herein, "significant event" is an event which triggers a significant observation by the process 55. Two major types of events include user initiated events (such as entering strokes into system 10 via stylus 38) and opportunistic events (such as an incoming fax alert). Such events are treated in a substantially similar manner if step 58 makes a significant observation about them.

Once the process 55 has made a significant observation about a new event, step 60 attempts to recognize a possible intent from the new event taken in the context that it occurs. As will be discussed in greater detail subsequently, context is taken from a set of significant observations which lead up to the new event. If an intent is not recognized, process control is returned to step 58.

If step 60 does recognize a possible intent from the new event, a step 62 hypothesizes an actual intent of the user. If step 60 fails to make a hypothesis, i.e. it results in a null hypothesis, process control is returned to step 58. If step 64 does produce a hypothesis, step 66 prepares to execute the hypothesized user intent. The preparation includes satisfying or attempting to satisfy all necessary preconditions to implement the intent.

Next, in a step 68, it is determined whether the hypothesized user intent should be executed. This step considers factors such as whether all preconditions to execution have been met, and whether the user requires confirmation prior to execution. If step 68 decides not to execute, then process control is returned to step 58.

In step 70 the hypothesized intent is finally executed. This involves the sequential execution of steps of a plan associated with the hypothesized intent, and the handling of any exceptions that might occur. If a non-continuable or fatal exception occurs, the execution of the plan is terminated. This step also asserts postconditions based upon the successful completion of process 55. These postconditions permit the process 55 to "learn", i.e. to adapt its world model based upon its own and the user's actions. This learning function permits the process 55 to make increasingly intelligent hypotheses of user intents.

Figure 4:
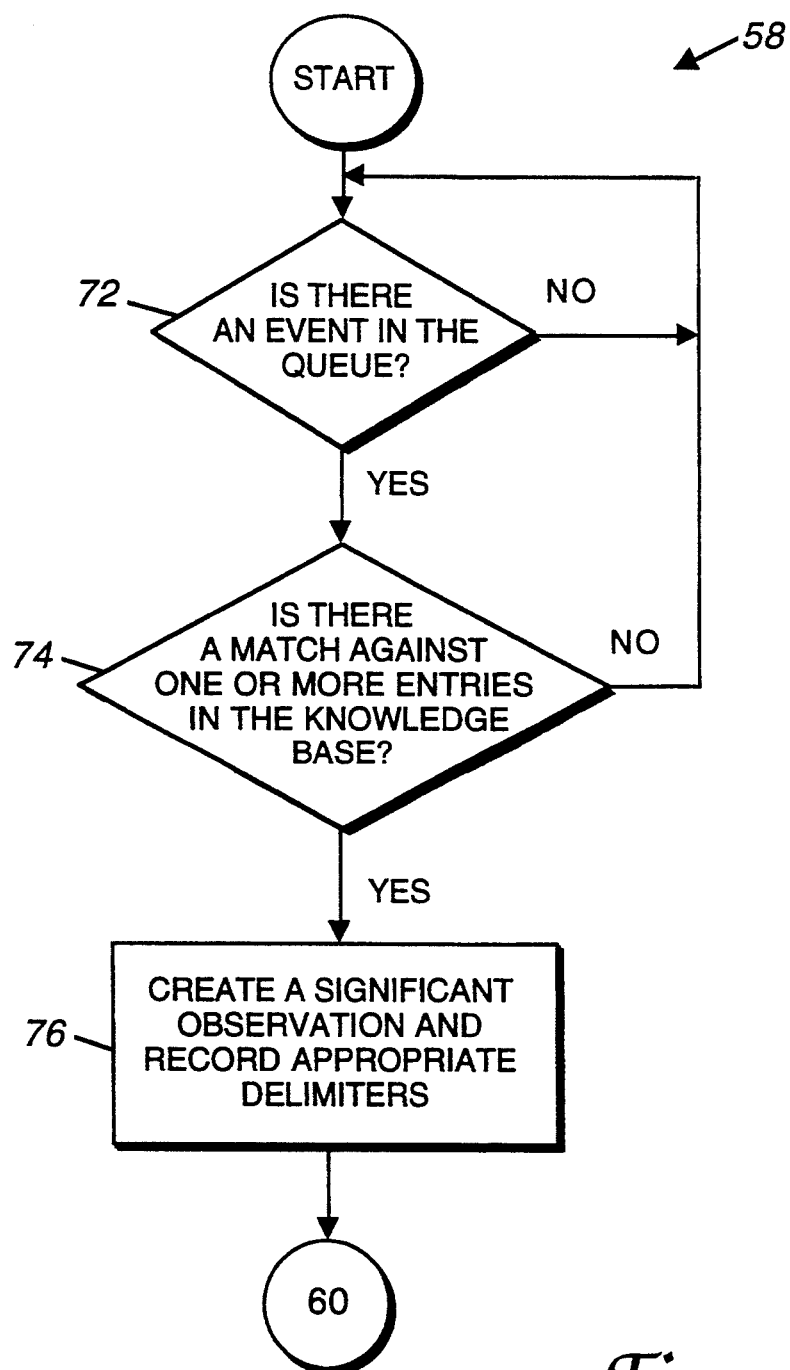
FIG. 4 is a flow diagram of step 58 of FIG. 3.

In FIG. 4, the step 58 of FIG. 3 is shown in greater detail. In a first step 72, the process 58 simply asks if there is an event of any type in the queue. System events are stacked in one or more queues by system software on a generally first-in-first-out (FIFO) basis until the system is ready to further process them. If there is not an event in the queue, step 72 is repeated until an event occurs.

Once an event has occurred, it is matched against one or more entries in a "knowledge base." As used herein, the term "knowledge base" refers to a collection of specialized databases having entries corresponding to significant events. The concept of the knowledge base will be explained with reference to FIG. 4a-4e.

Figure 4A:
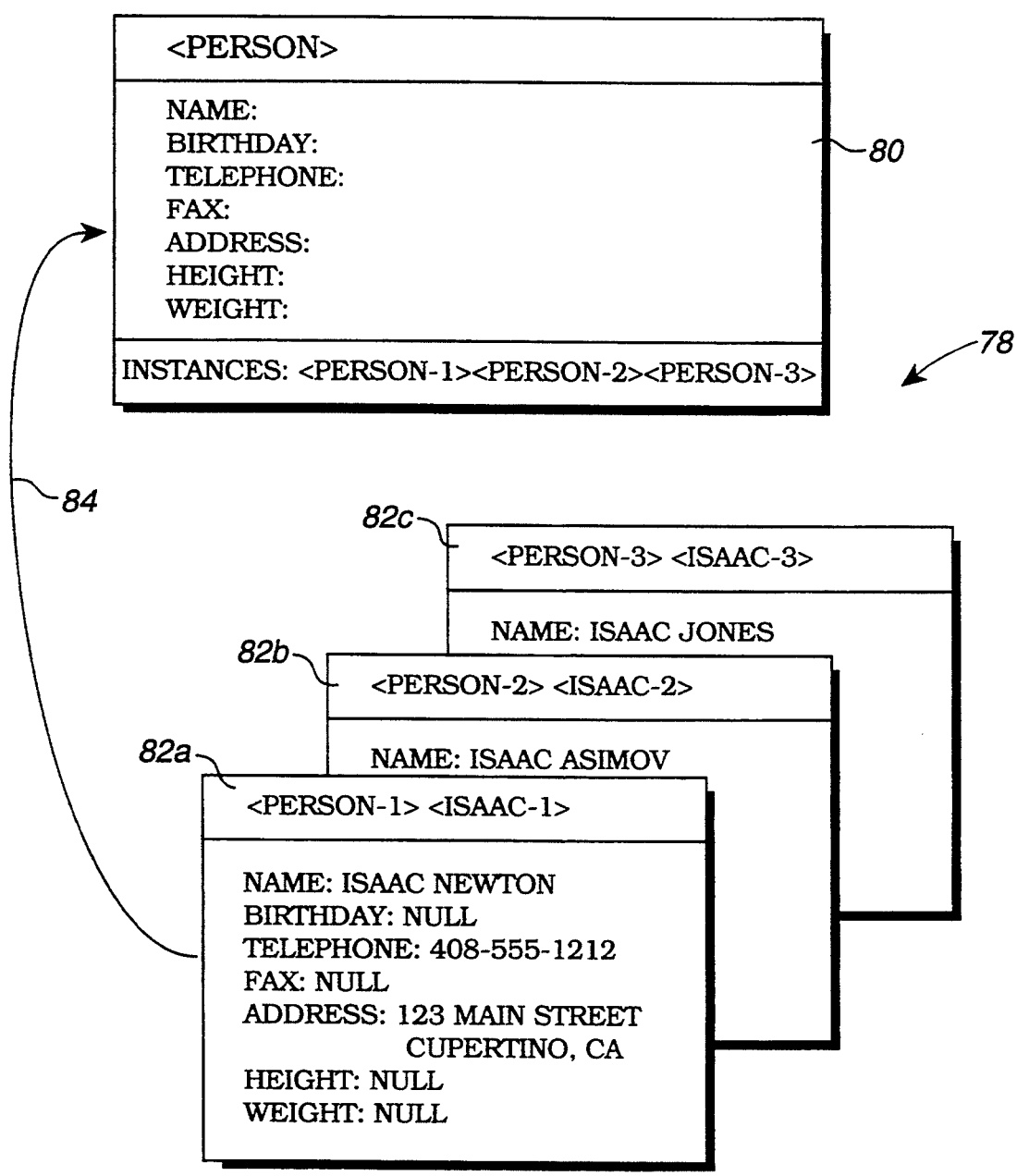
FIG. 4a illustrates a frame system of a semantic network utilized by the method of the present invention.

FIG. 4a illustrates a preferred data structure 78 for implementing the process 55 of the present invention. This preferred data structure is known as a "frame" system, which is a form of semantic network. As is well known to those skilled in the art, a semantic network is a knowledge representation system where unary predicates are treated like types and binary predicates are treated like attributes. Further, the types are arranged in a taxonomy where subassumption holds. For example, for every item x, predicate2(x) implies predicate 1(x) if predicate2 is a specialization of predicate1, i.e. DOG(-FIDO) implies MAMMAL(FIDO).

A second aspect of a semantic network is the notion that there exists a binary relation called an attribute that maps unary predicates. For example, consider the unary predicates DOG(FIDO) and COLOR(BROWN). An attribute may exist called COLOR-OF that can relate the unary predicates as follows:

COLOR—OF(DOG(FIDO),COLOR(BROWN))

or

COLOR—OF(FIDO,BROWN)

A semantic network can be represented by a directed graph where the nodes are either types or constants and the edges are either labeled with an attribute or with the special label IS-A. To find out if a particular individual has a certain attribute, a search is commenced at a node representing that individual and traveling up the IS-A links until a node is found with an edge labeled with the attribute. Therefore, graph traversal is the main source of inference in a semantic network.

As noted above, semantic networks are well known to those skilled in the art of building knowledge bases. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

The frame system is an elaboration of a semantic network. See, Brachman and Leveseque, supra. Frame systems elaborate on the structure of types themselves and their attributes. Specifically, frame systems have three aspects:

1) Values of attributes are stored explicitly or stored as a default value that the individual slot can inherit. This effectively caches some of the graph traversal.

2) Value or role restriction are constraints that must be satisfied by attribute values. These restrictions can constrain a value to be of a certain type (known as value class), of a certain maximum or minimum cardinality (in the case of multivalued slots), or a combination of both.

3) Attached procedures (also known as daemons or angels) that are invoked when a values is accessed (either by getting or setting). This allows values to be computed on-the-fly. The procedures can be completely arbitrary or be expressed in a restricted language. In either case, the procedure returns the computed value and whatever side-effects that may have occurred.

Frames used in the present invention have a number of slots which may contain data, daemons, or other frames. Slots are accessed by making assertions to the knowledge base. For example, if it was desired to retrieve all of the frames that were colored red, a typical frame accessor language query would be in the form of:

(QUERY (MEMBER—VALUE COLOR?x RED)

and would return a list of frames that have a COLOR slot whose value is red. Compound queries can also be made.

In FIG. 4a, frame 80 is a "type" frame of the type <PERSON>. Frame 80 has a number of slots for various attributes of being a person, such as NAME, BIRTHDAY, TELEPHONE, FAX, etc. Frame 80 also includes a list of all frames which are an instance of the type frame <PERSON>, namely <PERSON-1>, <PERSON-2>, and <PERSON-3>.

Frames 82a, 82b, and 82c are "instance" frames of the type <PERSON>. For example, frame 82a is instance <PERSON-1> of frame 80, and has the name <ISAAC-1>. Frame 82a is provided with the same slots as frame 80, except some of the slots are filled with data. For example, the NAME slot of frame 82a is filled with the name "ISAAC NEWTON." Unfilled slots have a null value or can be set to a default value. Likewise, frames 82b and 82c have slots filled with data about their Isaacs. As depicted by the arrow 84, there is a "IS-A" link between the instances frames 82a-82c and the type frame 80 for traversal of the semantic network.

Figure 4B:
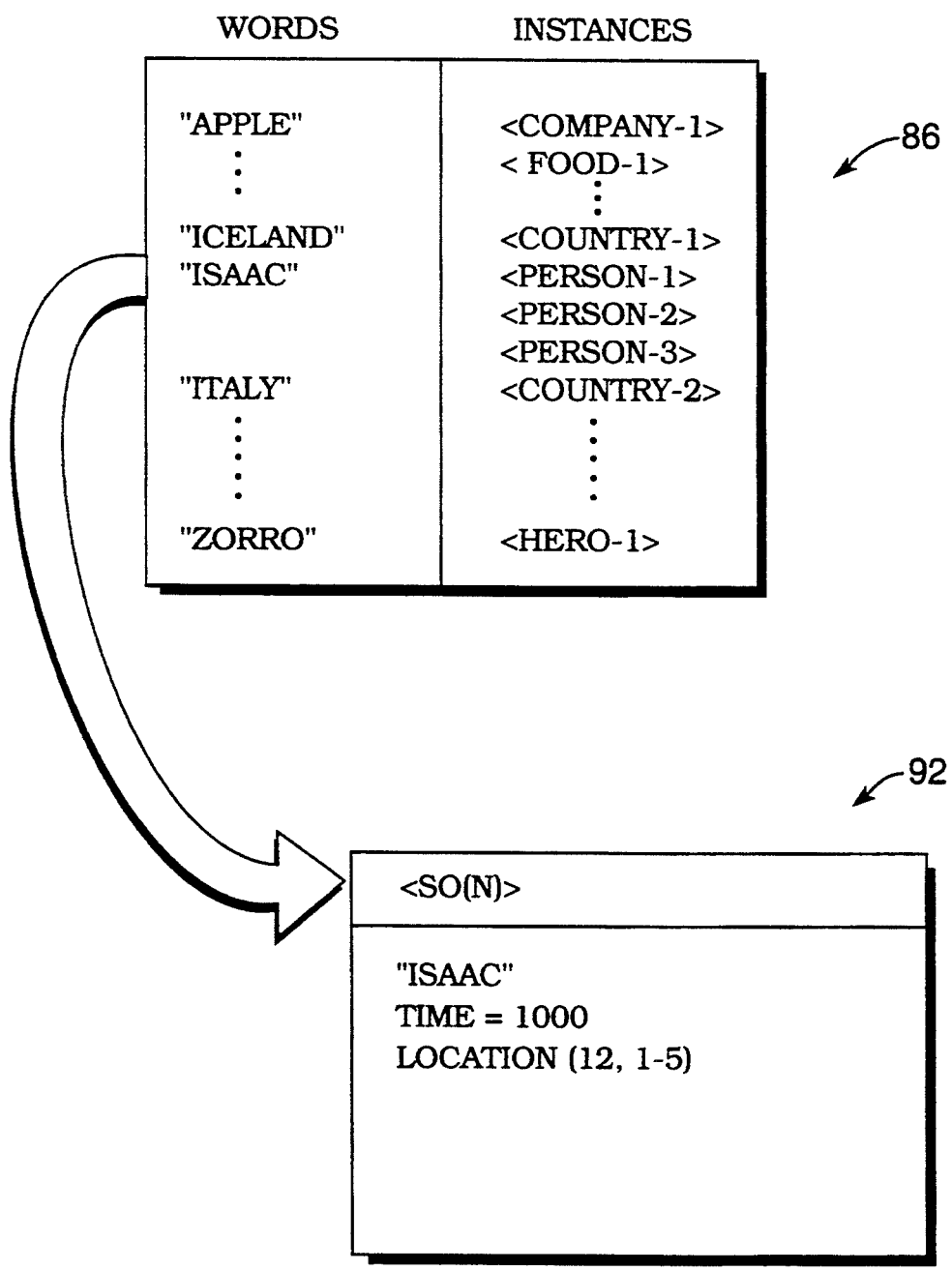
FIG. 4b illustrates a word look-up table.

FIG. 4b illustrates a first avenue for accessing the knowledge base comprising a word look-up table 86. On the left side of the table 86 is a list of recognized words and on the right side of the table is a list of instances of each of those words. For example, it can be seen that the word ISAAC has the three instances <PERSON-1>, <PERSON-2>, and <PERSON-3>.

Figure 4C:
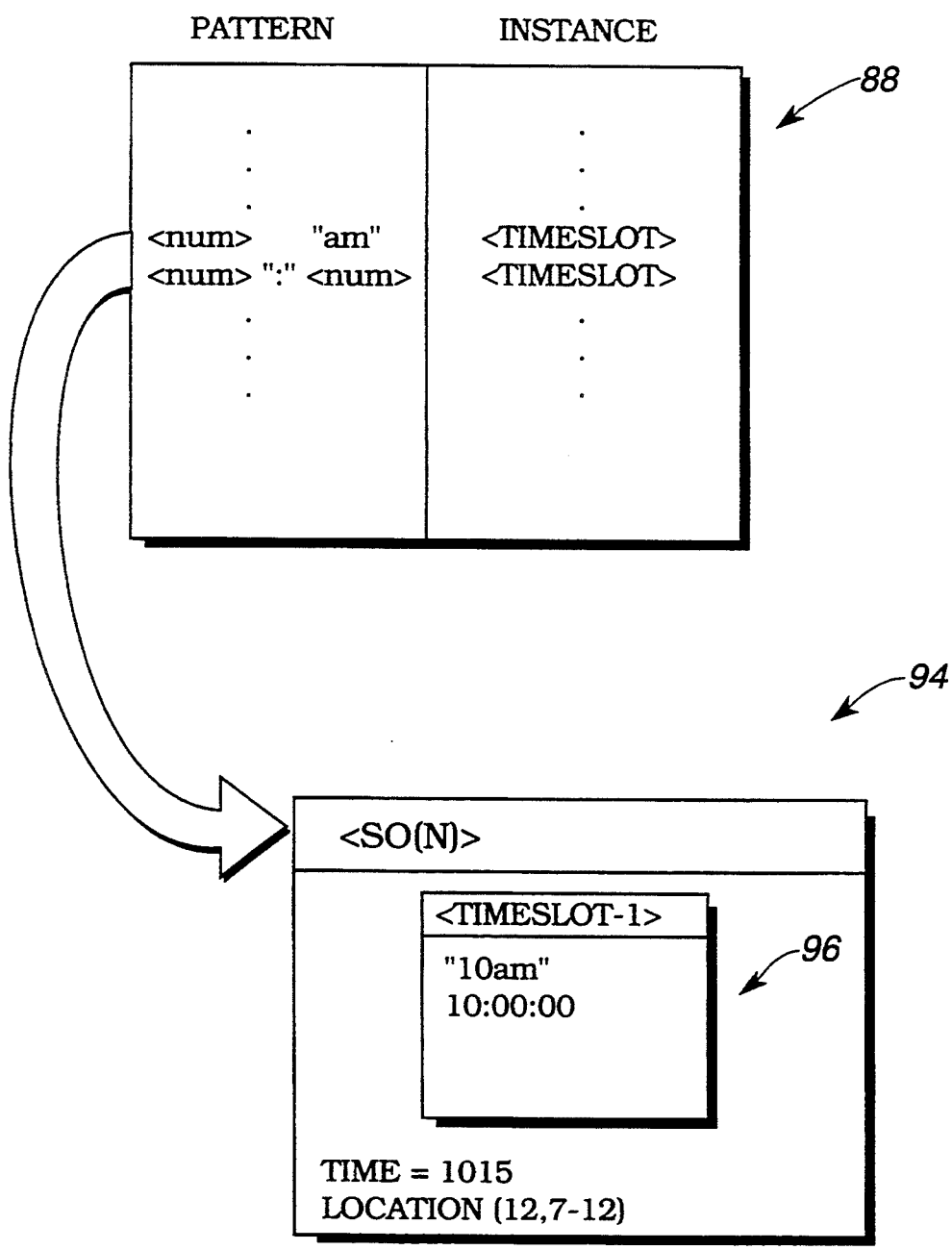
FIG. 4c illustrates a pattern look-up table.

FIG. 4c illustrates another way that the knowledge base can be accessed. A pattern table 88 has a column of patterns on its left-hand side, and a column of instances on its right-hand side. Two examples of patterns include "10 am" and "10:00", both of which signify the time 10 a.m. The patterns for these two events are as follows:

<num> "am"

and

<num> ":" <num> as noted in table 88. Essentially, the first pattern for morning time is a number followed by the string "am", and the second pattern for time is two numbers separated by the character ":". In either case, a match to the pattern look-up table would produce the instance <TIMESLOT>.

FIG. 4d shows yet another way to access the knowledge base. Here, a shape look-up table 90 includes such simple shapes as triangles, squares, circles, etc. Associated with each such shape is its instance. For example, the instance of the triangle shape is <TRIANGLE>.

FIG. 4e illustrates a method for accessing the knowledge base by means of an opportunistic event. As used herein, an "opportunistic event" is a significant event generated within the system 10 without direct user input which nonetheless presents an opportunity for providing deductive assistance to the user. As also used herein, "user intent" includes intents derived both from user initiated events and from opportunistic events. The method of FIG. 4e comprises an opportunistic look-up table 91 having opportunistic events listed in a left column and plan templates in a right column. For example, if the process detects the event <INCOMING FAX>, it will make the significant observation that it is an opportunistic event because it matches into the opportunistic look-up table 91. Opportunistic events differ from user-initiated events in that they are self delimiting. Opportunistic events tend to be handled on an immediate basis.

Returning to FIG. 4, if step 74 determines that there is a match into the knowledge base of an event (such as by a word, pattern, shape, or opportunity) then a significant event has occurred. In the event of a match, step 76 is executed and a significant observation is made of the event along with the development of appropriate delimiters. In the event that no match is made in step 74, process control is returned to step 72.

For example, in FIG. 4b when the word "ISAAC" is found in table 86, a frame 92 is created for significant observation number n and which is named <SO(n)>. A first slot of frame 92 containing the string "ISAAC", and the second and third slots contain its delimiters. The delimiter in the second slot is the time at which the event occurred. In this example, the event occurred at time 1000 units since the system 10 was powered up, or since the clock counter was otherwise reset. The delimiter in the third slot is the location at which the event occurred. In this case, the characters occurred at line 12, character spaces 1-5 on the screen 42. Of course, some other type of spatial measurement such as x-y coordinates can be used instead of line and space number. Therefore, the delimiters for this type of word event include the time and location at which the event occurred.

In FIG. 4c, a match to the first pattern <num> "am" produces a significant observation frame 94 having the name <SO(n)>, where n is the significant observation number. Within the frame 94 are three slots, the first of which comprises a frame 96. The frame 96 has the name <TIMESLOT-1>, and is therefore the first instance of frame type <TIMESLOT>. The first slot within frame 96 includes the string "10 am" which matched into the pattern table, and the second slot in frame 96 includes the numeric value of the string, i.e. 10:00:00. The second slot in frame 94 includes the time at which the event occurred, e.g. at time 1015 units. The third slot in frame 94 includes the location at which the event occurred, e.g. on line 12, character spaces 7-12. Again, the delimiters for this pattern look-up table are time and location.

Frame structures similar frame structures 92 and 94 are also provided for the shapes look-up table 90 and the opportunistic look-up table 91.

Figure 5:
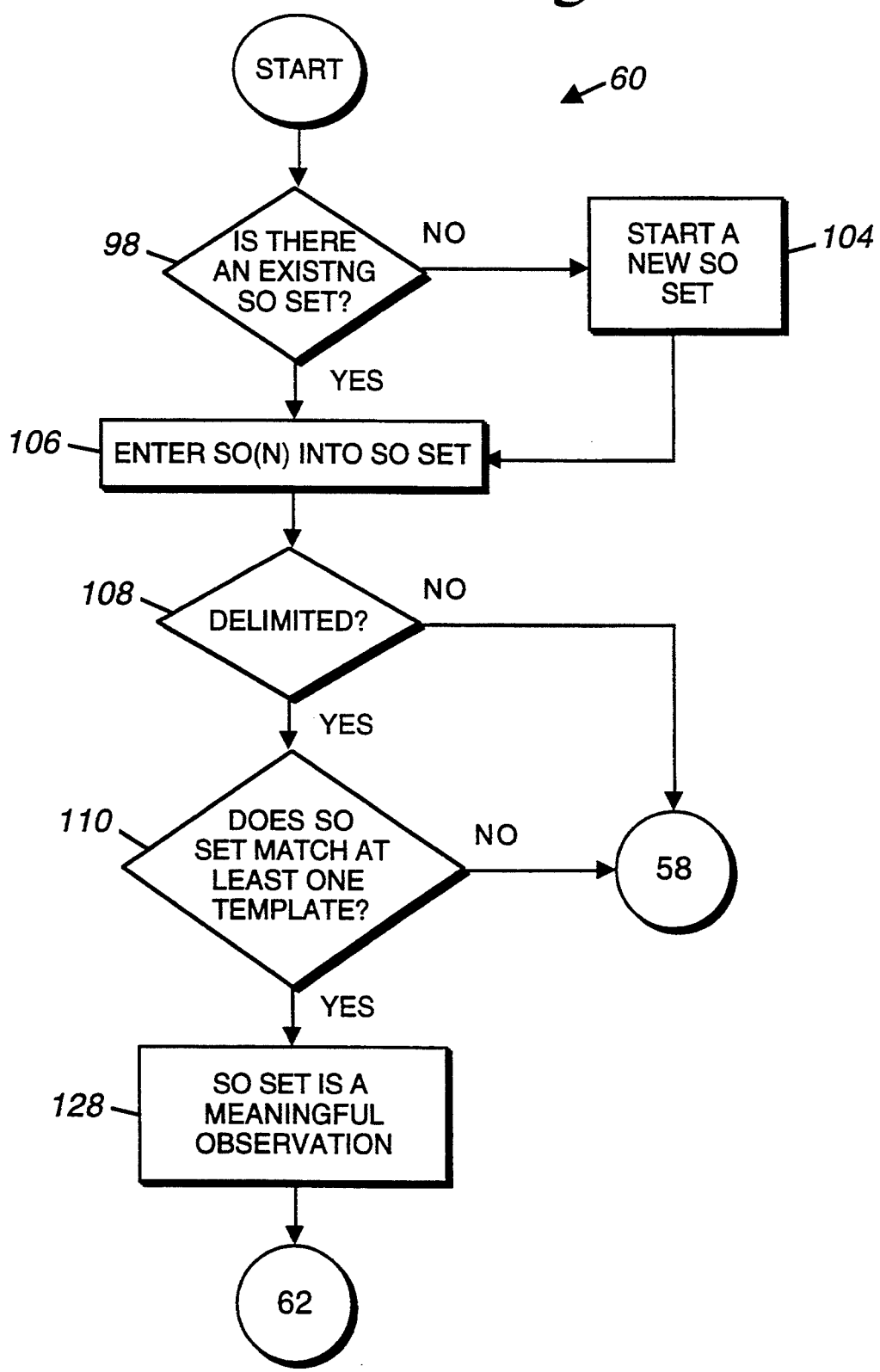
FIG. 5 is a flow diagram of step 60 of FIG. 3.
Figure 5A:
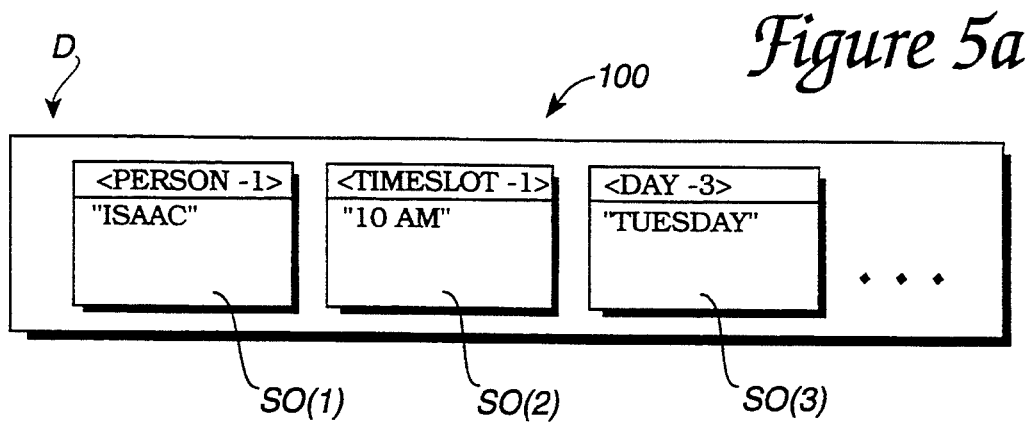
FIG. 5a illustrates a significant object set.

Referring to FIG. 5, after the completion of step 76 the process of step 60 is executed. In a first step 98 it is determined whether there exists a significant object (SO) set. An example of an SO set 100 is shown in FIG. 5a. The SO set 100 includes three significant objects (SO) SO(1), SO(2) and SO(3). The SO set 100 had been delimited at D, so that SO(1) is the first SO in the set. If there is no existing SO set, because no significant observations had yet been made in the system or because no significant observations had been made since the last delimiting event, a new, empty SO set is created by step 104.

Next, in a step 106 the current significant observation SO(N) is entered into the SO set 100. Once entered, the process 60 asks whether the SO set 100 has been delimited. Often, SO set 100 is delimited by either a timeout or a spaceout. Taking the example of FIG. 5a, if SO(1) is closely followed in time and space by SO(2), and SO(2) is closely followed in time and space by SO(3), there will be no timeout or spaceout between those significant observation. However, if after SO(3) there is a long pause, or if the next event is located at some distance from SO(3), then the SO set 100 is delimited to include just significant objects SO(1)-SO(3). By "timeout" it is meant that the difference between the current system time and the time delimiter stored in the frame of the last significant observation is greater than a threshold value, e.g. 0.5 second. By "spaceout" it is meant that the difference between the current stylus location on screen 42 and the location delimiter stored in the frame of the last significant observation is greater than a threshold value, e.g. one centimeter.

Different types of significant observations will have different types of delimiters. For significant observations derived from stylus-implemented events, time and space are the main delimiters. Other significant observations may be self delimiting, rely only on a timeout, be explicitly delimited by the user, be self delimited, etc. The user can, for example, explicitly delimit by providing a recognized delimiter gesture (such as encircling the object to be delimited) or by selecting the object to be delimited and pressing an "assist" button on keypad 23.

Self delimiters can be thought of as delimiters created at the discretion of the system. For example, when the system detects an incoming fax, the fax can be self delimited. In another example, if a user is filling in a field of a form with characters or numbers, the system may self delimit when the user reaches the end of the field before any timeout or spaceout occurs. The system might decide to self delimit after each significant observation to determine if there is a potentially meaningful significant object set, and then unassert the delimit if there is not. The system might even decide to (reversibly) self delimit within a word to attempt to find meaning. For example, if SO(1) was "map" and a user starts to write "Czechoslovakia", the system might self delimit after every letter and decide at "Czech" that a user was requesting a map of Czechoslovakia.

If the significant observation set 100 is not delimited, process control is returned by step 108 to step 58 to await more significant observations, which are then added to the SO set 100. If SO set 100 is delimited, a step 110 attempts to match the SO set against a number of task templates.

Figure 5B:
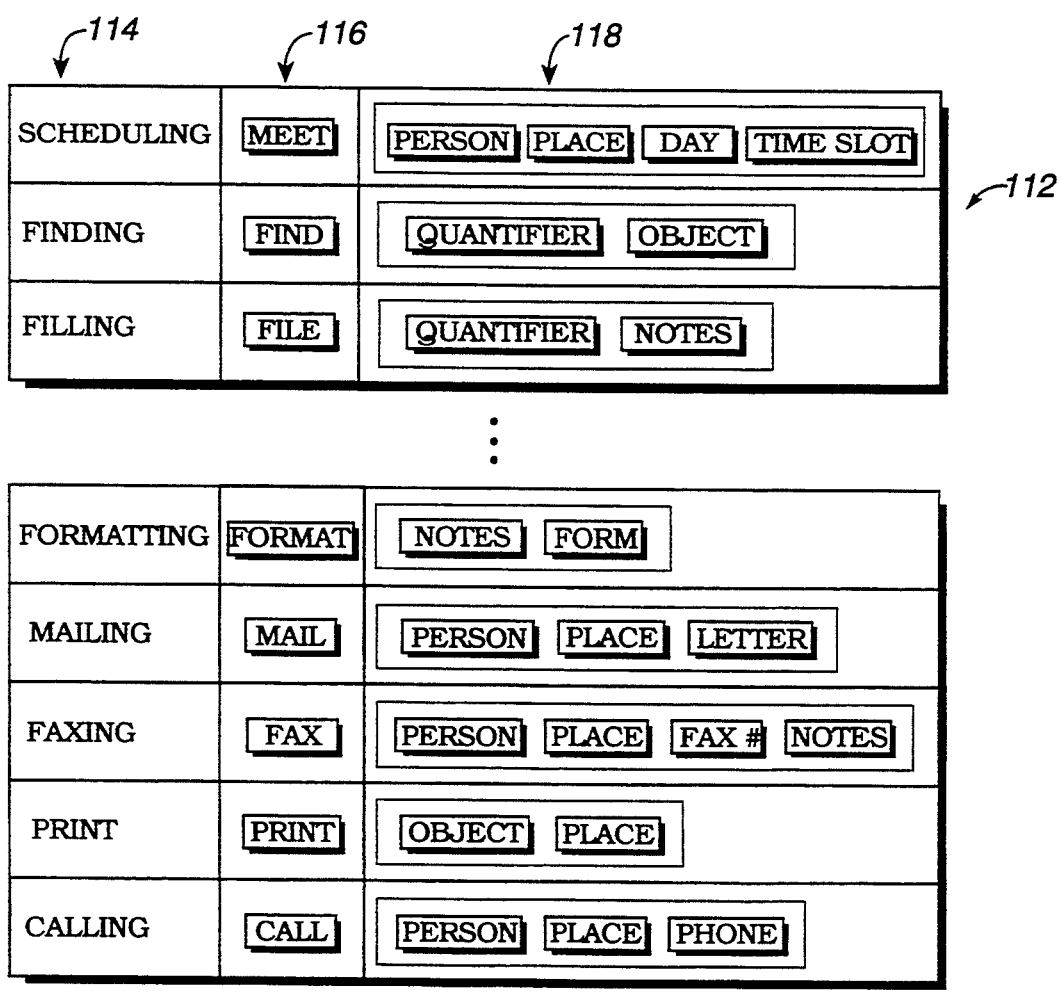
FIG. 5b illustrates a word activated task template.

A word activated task template 112 is shown in FIG. 5b. A first column 114 holds the task type. Examples of task types are SCHEDULING, FILING, FAXING, etc. A second column 116 holds the action plan (i.e. the steps of a plan) corresponding to the task type. For example, the action plan MEET holds the steps to accomplish the task SCHEDULING. A third column 118 includes the preconditions for accomplishing the associated task. For example, the task SCHEDULING requires information concerning the PERSON, PLACE, DAY and TIME of the meeting.

The significant objects in the SO set 100 are matched against the precondition slots (column 118) for each task type (column 114). For the example inherent in FIGS. 5a and 5b, SO(1) will match the PERSON precondition of tasks SCHEDULING, MAILING, FAXING, and CALLING; SO(2) will match the TIMESLOT precondition of task SCHEDULING; and SO(3) will match the DAY precondition of task SCHEDULING. The match of any significant observation into any precondition slot of any task will result in an at least partial match to the set of templates, satisfying the condition of step 110.

Figure 5C:
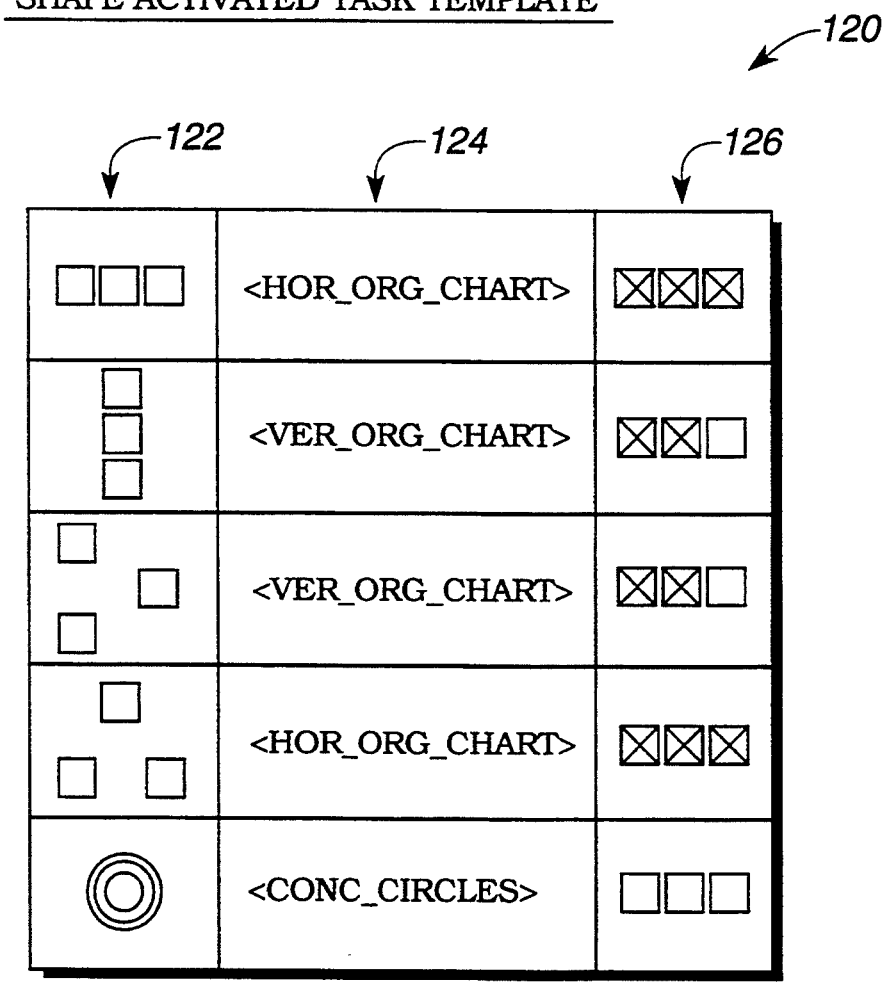
FIG. 5c illustrates a shape activated task template.

Analogous types of templates can be used for other significant object sets. For example, in FIG. 5c, a shape activated task template 120 is used to recognize patterns of simple shapes. The template 120 has three columns 122, 124, and 126. The first column 122 holds various patterns of simple shapes. The pattern types are listed in column 124, and the number of matches are listed in column 126.

Figure 5D:
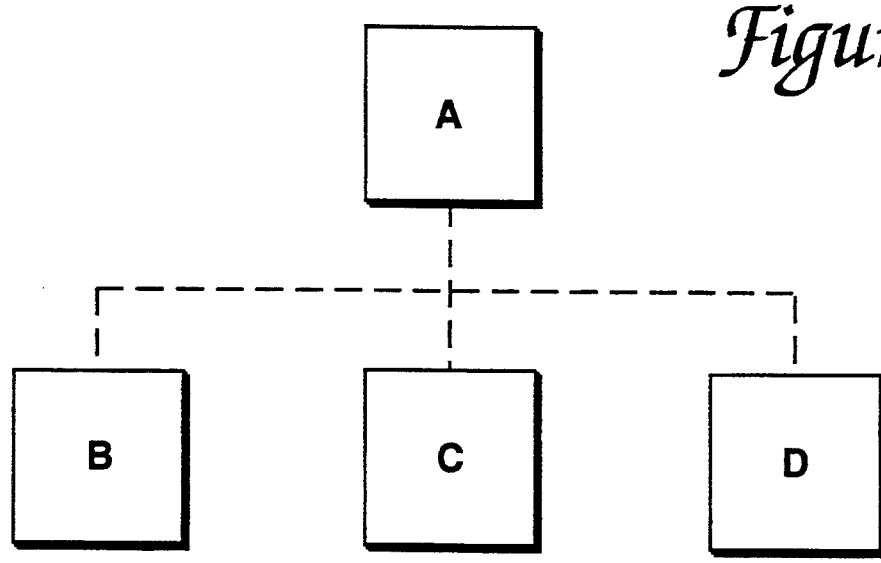
FIG. 5d is an example of a pattern of shapes which can cause multiple matches into the shape activated template of FIG. 5c.

An example of the recognition of an organizational chart will be discussed with additional reference to FIG. 5d. If a user used stylus 38 to draw rectangles A, B, C and D on screen 42, the shape activated task template 120 would be matched as shown in column 126 of FIG. 5c. The first row of template 120 would match three times with rectangles B, C, and D. The second row of template 120 would match twice with rectangles A and C, as would the third row. The fourth row of template 120 would match three times with rectangles A, B, and D. The fifth row, containing concentric circles, would not match with any of the rectangles of FIG. 5d. Task templates similar to templates 112 and 120 can be used for matching to other types of events, such as opportunistic events.

As mentioned previously, the match of any significant observation into any precondition slot of any task will result in an at least partial match to the set of templates, satisfying the condition of step 110. If there is not at least one match, the process control returns to step 58. If there is at least one match, step 128 of FIG. 5 makes the meaningful observation that the SO set 100 includes at least one potential intent. Process control is then passed to step 62 of FIG. 3.

Figure 6:
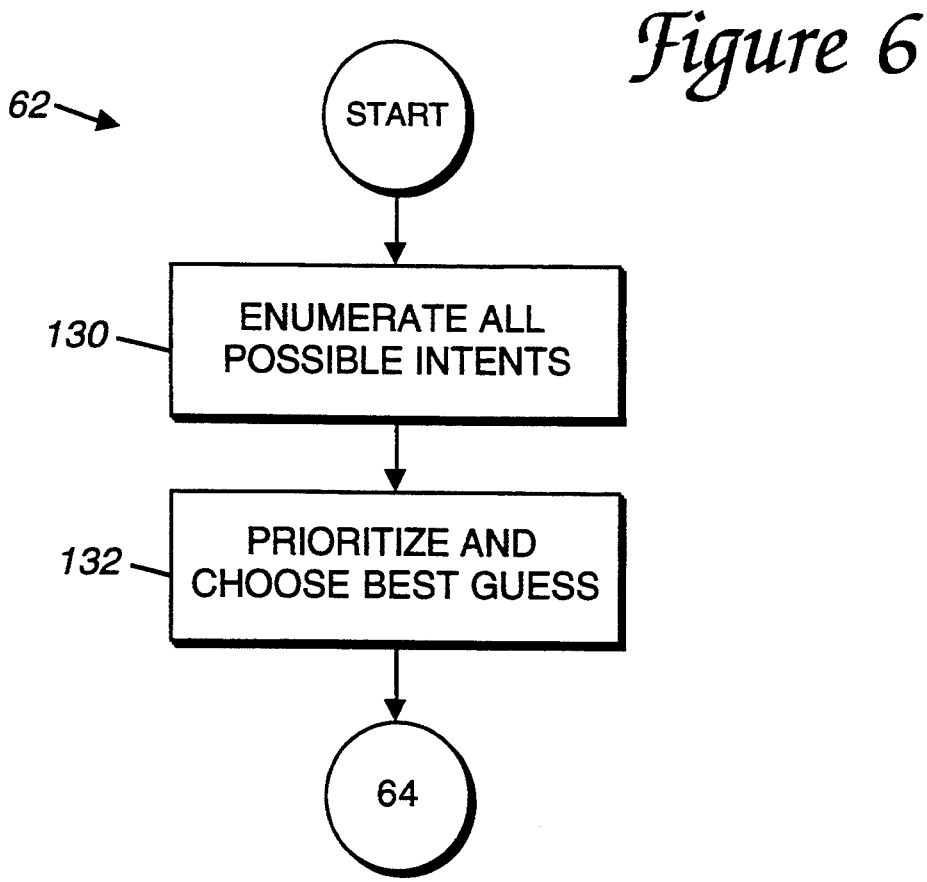
FIG. 6 is a flow diagram of step 62 of FIG. 3.

Step 62 is illustrated in greater detail in FIG. 6. Step 62 is essentially a two step process. In a first step 130 all possible user intents are enumerated from the task templates. In a second step 132, the possible user intents are prioritized, and the intent with the highest priority is chosen as the best-guess hypothesis. Process control continues with step 64 after the best-guess hypothesis is made.

Figure 6A:
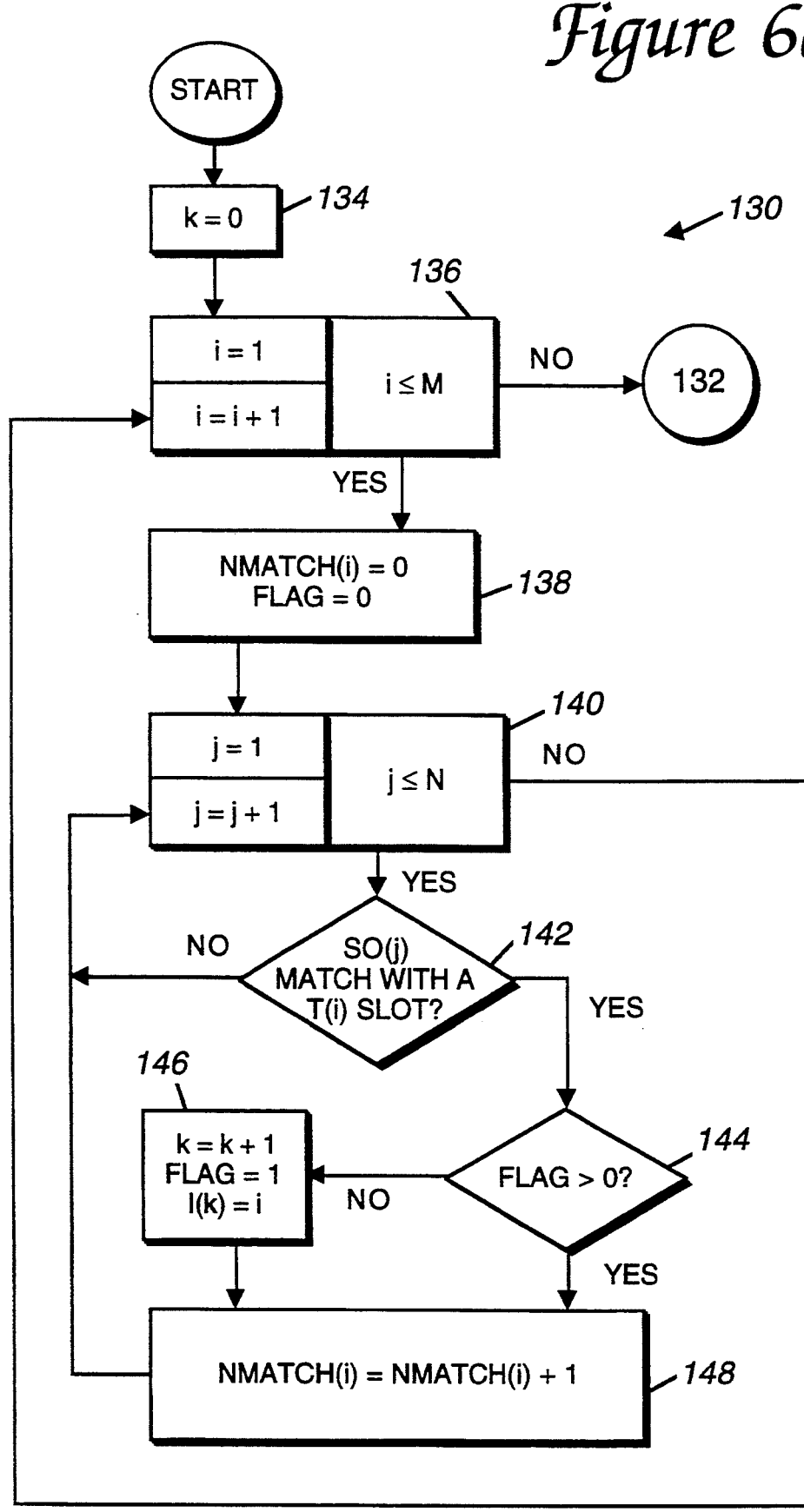
FIG. 6a is a flow diagram of step 130 of FIG. 6.

FIG. 6a provides more detail about the step 130 "enumerate all possible intents". The process illustrated in FIG. 6a uses conventional programming logic and is one preferred method for accomplishing step 130. However, as is well known to those skilled in frame system programming, many of the steps of FIG. 6a can be accomplished with a simple frame accessor language query, which is another preferred method for accomplishing step 130. For example, the following frame accessor language query would "enumerate all possible intents" for templates having the slots <PERSON>, <TIME-SLOT>, and <DAY>:

```
(QUERY (AND
            (?x HAS SLOT-TYPE <PERSON>)
            (?x HAS SLOT-TYPE
   <TIME-SLOT>)
            (?x HAS SLOT-TYPE <DAY>)))
```

The variable ?x holds the set of all matching templates.

In FIG. 6a a step 134 initializes a counter k to zero. Next, in an iterative loop step 136, a counter i is iterated by one in the range i={1::M}, where M is the number of templates available in the system. In a step 138, the variables(i) and FLAG are set to zero. Another iterative loop step 140 iterates j by one in the range j={1::N}, where N is the number of significant observations in the SO set 100. Next, in a decision step 142, the type of the $j^{th}$ significant object in the significant object set (i.e. SO(j)) is compared with the slots of the $i^{th}$ template T(i). If there is no match, process control is returned to step 140 and j is iterated. If there is a match, step 144 determines whether the flag is set, i.e. if FLAG >0. If it is not, step 146 iterates a counter k by one, sets the flag variable FLAG to one, and assigns the value i to the $k^{th}$ intent array I, i.e. I(k)=i. After the completion of step 146 or after step 144 determines that the flag has been set, step 148 iterates the variable NMATCH(i) by 1 before returning process control to iterative loop step 140.

The result of iterative loop step 140 is to add a template number i to intent array I if there is at least a partial match of the SO set 100 into template T(i). Array NMATCH stores the number of matches between the SO set 100 and template i. Upon the completion of step 140, process control is returned to step 136 to repeat the process with the next template i. When iterative loop step 136 has been completed, process control passes to step 132.

Figure 6B:
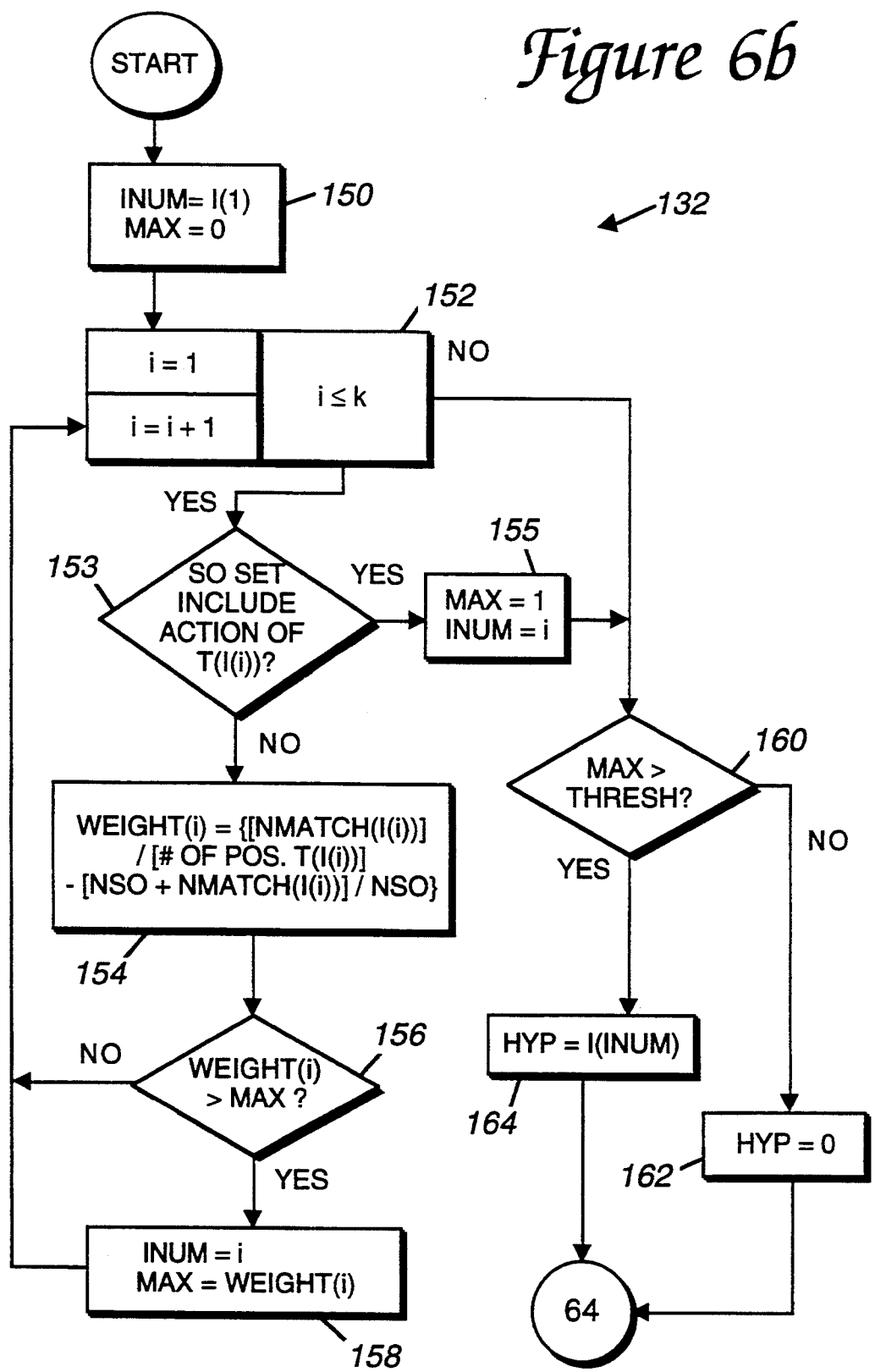
FIG. 6b is a flow diagram of step 132 of FIG. 6.

In FIG. 6b, step 132 receives the variable k, which is the number of template matches and, therefore, the number of possible user intents. Step 132 also receives the intent array I(i), where i is in the range of i={1::k}. In each slot of I(i) a template number is stored. Associated with intent array I(i) is array NMATCH(i), where i is again in the range of i={1::k }. The number of matches between the SO set 100 and the template(I(i)) is stored in each NMATCH(i).

An initialization step 150 sets the variable INUM to I(1) and the variable MAX to zero. An iterative loop step 152 iterates i in the range i={1::k}, where k is the number of possible intents (template matches). The significant observation set is then scanned in step 153 for an SO which matches a plan slot of template T(I(i)). For example, if "Meet" is in the SO set, it will match with the plan slot for template "Scheduling". If there is a match in step 153, there is no need for further analysis of intent (i.e. the user has made his intent explicit), and MAX is assigned the value 1 and INUM is assigned the value i in a step 155 and process control is turned over to step 160. Otherwise, in a step 154, the weight for the $i^{th}$ possible intent is calculated as follows:

WEIGHT(i)={[NMATCH(I(i))]/[# of positions in T(I(i))]−[NSO−NMATCH(I(i))]/NSO} where NSO is the number of significant objects in the SO set. WEIGHT(i) therefore takes the percentage of matches of the SO set 100 into intent template T(I(i)) and subtracts out a factor which prevents templates with fewer slots from dominating the weighting algorithm. In a decision step 156, WEIGHT(i) is compared to the variable MAX, and if it is greater, the variable INUM is set to i and the variable MAX is set to WEIGHT(i) in a step 158. After step 158 is completed or if WEIGHT(i)≦MAX, process control is returned to step 152. Of course, there are many other types of weighting algorithms, well known to those skilled in the art.

After k cycles through iterative loop step 152, decision step 160 compares MAX with a threshold value THRESH. The threshold value represents the confidence level required by the user before automatic execution of an intent will be allowed. For example, if THRESH=1, an automated execution of an intent would never happen. If THRESH=0.99, MAX will have to be greater than 0.99 to execute, which probably means that there is a perfect match between the SO set 100 and an intent template. If THRESH=0, any possible intent will be allowed to execute.

If MAX is not greater than THRESH, the variable HYP is set to zero in a step 162. This would represent the null hypothesis. If MAX is greater than THRESH then the variable HYP is assigned the value of the intent template with the highest number of matches to the SO set 100. Process control is returned from both steps 162 and 164 to step 64 of FIG. 3.

In step 64 of FIG. 3, the variable HYP is examined and, if it is equal to zero, process control is returned to step 58. If there is a hypothesis, i.e. HYP≠0, step 66 is executed.

Figure 7:
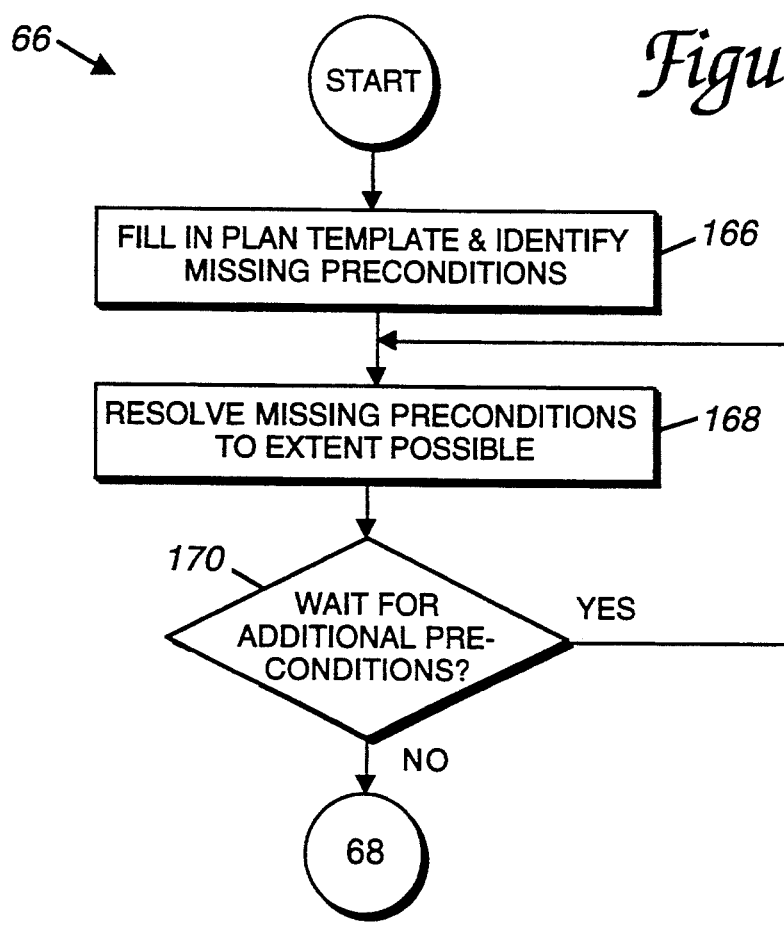
FIG. 7 is a flow diagram of step 66 of FIG. 3.

Step 66 is illustrated in greater detail in FIG. 7. In a first step 166, a plan is derived from the intent template T(HYP), and as many of the significant observations of SO set 100 as possible are filled into the precondition slots. Depending upon the value of THRESH, this could be some or all of the precondition slots. Any missing preconditions are identified at this point.

It is required that all preconditions of the template T(HYP)) be met before execution of the steps of the plan. Therefore, process 66 attempts to resolve missing preconditions to the plan to the extent possible in a step 168. Step 170 determines whether process 66 should wait for any additional preconditions to occur. An affirmative determination returns process control to step 168. A negative determination of step 170 returns process control to step 68 of FIG. 3.

Figure 7A:
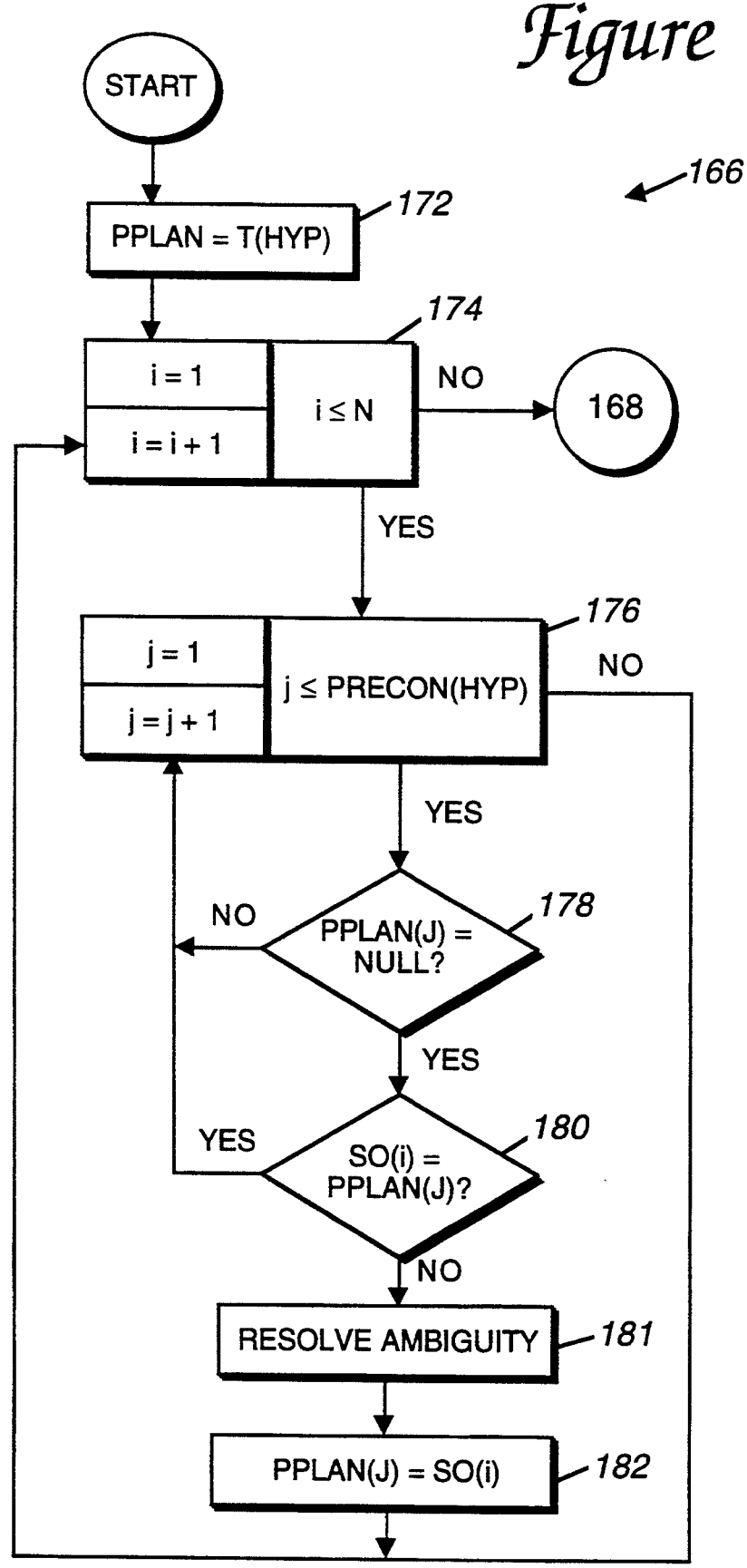
FIG. 7a is a flow diagram of step 166 of FIG. 7.

Step 166 of FIG. 7 is shown in greater detail in FIG. 7a. Again, the diagram of FIG. 7a presents the process 166 in conventional flowcharting form. Many of the steps illustrated in FIG. 7a can be more compactly accomplished by utilizing well-known frame system query techniques.

In FIG. 7a, a first step 172 assigns the template T(HYP) to the template PPLAN. In an iterative loop step 174 the counter i is iterated in the range i={1::N}, where N is the number of significant observations in SO set 100. Next, in an iterative loop step 176, the counter j is iterated in the range of j={1::PRECON(HYP)}, where PRECON(HYP) is the number of preconditions for the PPLAN. In a step 178, if the $j^{th}$ precondition of PPLAN, i.e. PPLAN(j), is a null, process control is returned to step 176. Otherwise, in a step 180 the $i^{th}$ significant observation in the SO set 100 (SO(i)) is compared to the $j^{th}$ precondition of the plan (PPLAN(j)) and, if they are the same process control is returned to step 176. If the result of the decision step 182 is in the negative, any ambiguity as to the meaning of SO(i) is resolved in a step 181. For example, if "Isaac" is specified as a <PERSON>, the step 181 resolves ambiguity by picking one of the Isaacs in the knowledge base by a form of heuristic reasoning, as will be discussed in greater detail subsequently. If the process cannot resolve the ambiguity on its own, the user may be queried. Next, a PPLAN(j) is assigned the value of SO(i), thereby fulfilling the $j^{th}$ precondition of PPLAN. Process control is then returned to step 174. Upon completion of step 174, process control is returned to step 168.

Figure 7B:
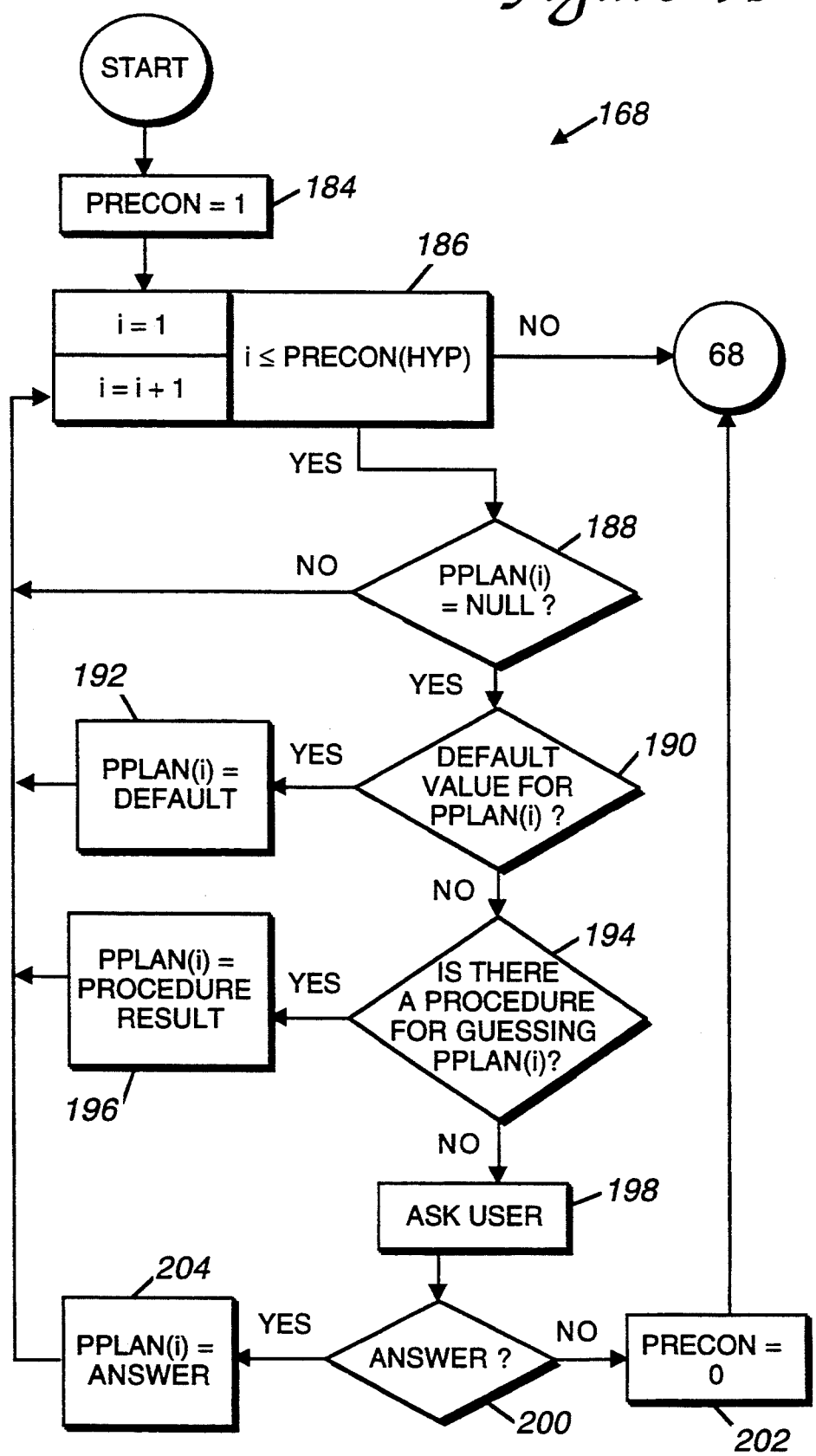
FIG. 7b is a flow diagram of step 168 of FIG. 7.

FIG. 7B illustrates step 168 of FIG. 7 in more detail. In a first step 184, a flag PRECON is set to one. Next, an iterative loop step 186 iterates a counter i in the range i={1::PRECON(HYP)}. In a step 188, if the $i^{th}$ precondition for PPLAN (i.e. PPLAN(i)) is filled, process control is returned to step 186. If PPLAN(i) is a null, a step 190 determines whether there is a default value for PPLAN(i). If there is, PPLAN(i) is assigned the default value in a step 192. For example, if PPLAN(i) calls for DAY, and no day is provided by the SO set 100, then DAY may default to the current day. In decision step 194 it is determined whether there is a procedure for guessing PPLAN(i). For example, if PPLAN(i) calls for a PERSON, a heuristic procedure might guess that the person is the person most frequently called out of the last ten persons called. Alternatively, the heuristic procedure may make the simple guess that PERSON was the last person mentioned by the user in another context. Both of these are forms of system adaptation. If there is a procedure for guessing PPLAN(i), PPLAN(i) is set to the resulting value of the procedure in step 196.

If there is no default value and there is no procedure for guessing the missing precondition PPLAN(i) the user of the system 10 is asked in a step 198 to provide the missing precondition. If there is a valid answer by the user in step 200, precondition PPLAN(i) is set to user's answer. If there is not a valid answer, the flag PRECON is set to zero to indicate that the PPLAN(i) precondition is unfulfilled. Process control is returned to iterative loop step 186 after steps 192, 196, and 204, and to step 68 after step 202.

Figure 8:
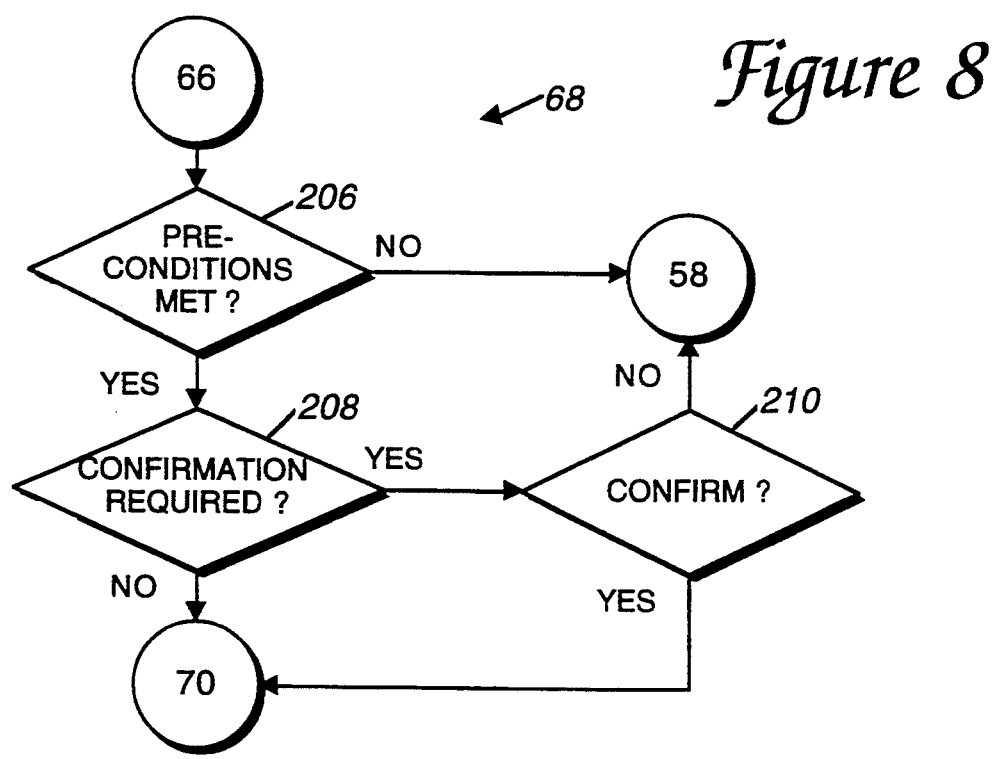
FIG. 8 is a flow diagram of step 68 of FIG. 3.

After the completion of iterative loop step 186 process control is returned to step 68 of FIG. 3. Step 68 is shown in greater detail in FIG. 8. In a decision step 206, it is determined whether all preconditions have been met, i.e. if PRECON≠0. If they have not all been met, process control is returned step 58 of FIG. 3. If they have all been met, the process 68 determines whether user confirmation is required in a step 208. The confirmation requirement can be set by the user for various services depending upon the user's level of confidence that the system will perform correctly. If no confirmation is required, process control is turned over to step 70. If confirmation is required, a step 210 asks the user if the service should be executed. If the user answers in the negative, process control is returned to step 58, and if the user answers in the affirmative, process control is returned to step 70.

The following is an example of an executable plan to schedule a meeting. This plan is derived from the slot labeled "Meet" at the intersection of column 116 and row Scheduling of FIG. 5b, and will be used to help explain step 70 with reference to FIG. 9.

---
PLAN "Meet" of "Scheduling"
SPLAN(I):
1. Check calendar for available TIME_SLOT.
   a) If TIME_SLOT is available, set POSTCOND(1) to <TIME_SLOT_AVAILABLE>
   b) If TIME_SLOT is not available, set EXCEPTION to <TIME_SLOT_BUSY>
2. Attempt to seize calendar.
   a) If calendar is seized, set POSTCOND(2) to <CALENDAR_LOCKED>
   b) If calendar is not seized, set EXCEPTION to <CALENDAR_BUSY>
3. Attempt to make appointment.
   a) If appointment made, set POSTCOND(3) to <APPT_ENTERED>
   b) If appointment not made, set EXCEPTION to <WRITE_FAILURE>
4. Attempt to release calendar.
   a) If calendar released, set POSTCOND(4) to <CALENDAR_UNLOCKED>
   b) If calendar not released, set EXCEPTION to <RELEASE_FAILURE>
---

Figure 9:
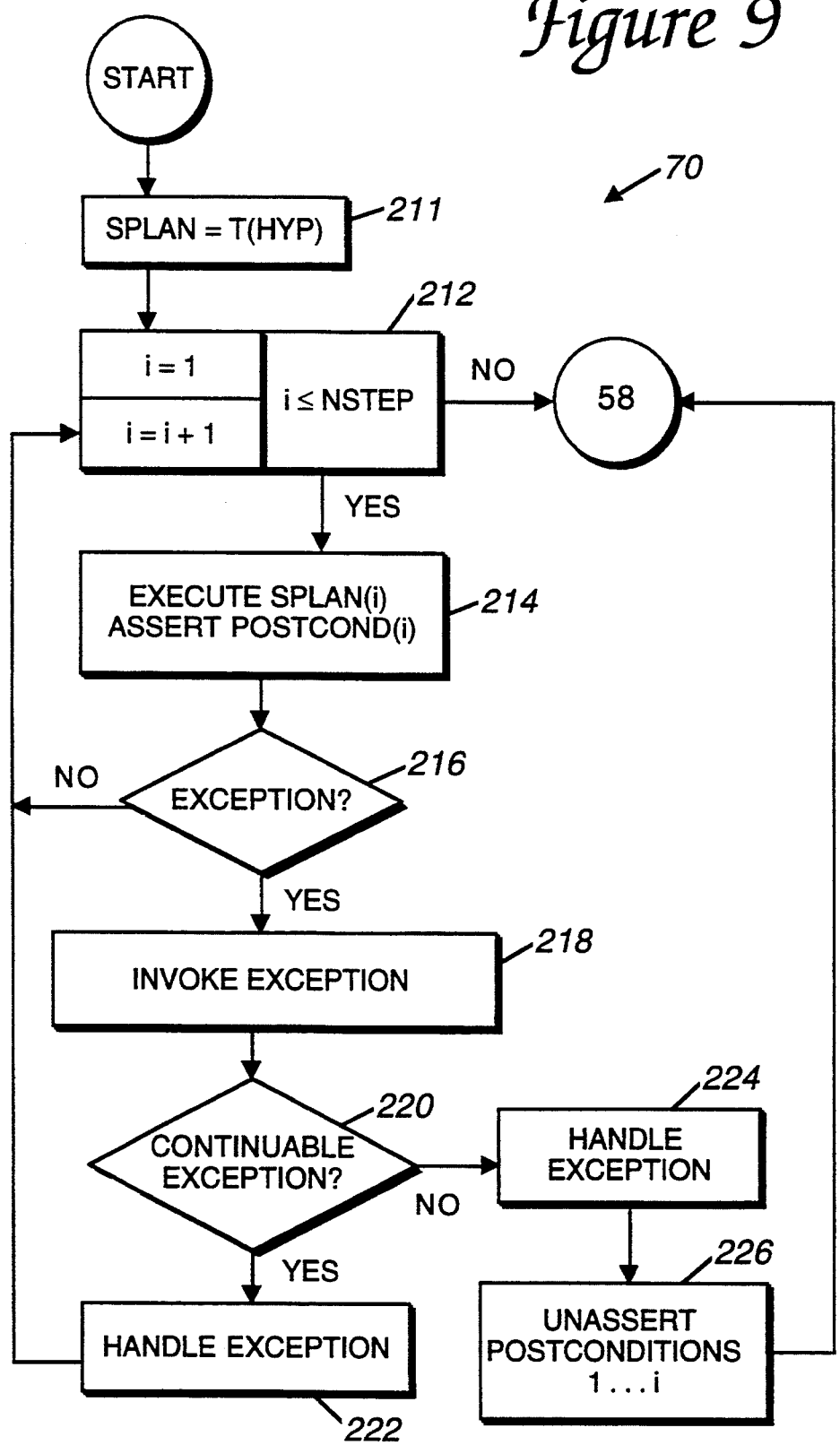
FIG. 9 is a flow diagram of step 70 of FIG. 3.

Step 70 of FIG. 3 is shown in greater detail in FIG. 9. The plan steps stored in T(HYP) are transferred to an array SPLAN in a step 211. Using the example of plan MEET, above, the four steps of plan MEET are read into the array SPLAN. An iterative loop step 212 iterates a counter i in the range i={i::NSTEP}, where NSTEP is the number of plan steps in SPLAN. For this example NSTEP=4. Step 214 executes (or attempts to execute) the first step SPLAN(i) and asserts the first postcondition POSTCOND(i), which in this case is <TIME_SLOT_AVAILABLE>. If plan step SPLAN(i) executes properly, process control is returned to step 212. Otherwise, there is an exception detected by decision step 216. In the case of an exception, an exception handler is evoked in a step 218. For example, if the time slot is not available, the EXCEPTION(1) would be <TIME_SLOT_BUSY>, and step 218 would be evoked. If step 220 determines that it is a continuable exception, the exception is handled in a step 222 and process control is returned to step 212. For example, EXCEPTION(1) could be handled by asking the user if they wanted to make an appointment for that time even if it were busy. If it is not a continuable exception, the exception is handled in a step 224, all postconditions from POSTCOND(1) to POSTCOND(i) are unasserted in step 226, and process control is returned to step 58 of FIG. 3. For example, if there were a write failure in step SPLAN(3), the POSTCOND(1) and POSTCOND(2) would be unasserted by step 226.

The postconditions are useful in adapting the world model of the deductive assistant (i.e. process 55). For example, if there is a postcondition <CALENDAR_LOCKED>, the deductive assistant will react differently the next time it deduces a user intent to access the calendar. The postconditions can also be used to develop an understanding of a user's preferences. For example, if nine times out of ten "Bob" means "Bob Smith" and not "Bob Jones", the process 55 can preferentially assume the user is referring to Bob Smith when he enters "Bob" into the system.

In consequence, a knowledge of postconditions can be used by the system to resolve ambiguities, such as in step 181 of FIG. 7a. This is commonly accomplished by maintaining history list of recently asserted postconditions which can be searched by postcondition type. For example, a history list of 100 elements might contain 20 references to "Isaac Newton" and 5 references to "Isaac Asimov". Subsequently, when "Isaac" is referred to, the system could infer that the user is referring to "Isaac Newton" because of the user's recent usage of the term "Isaac".

A knowledge of postconditions can also provide default values for missing preconditions. For example, in step 190 of FIG. 7b, default values can be supplied based upon recently asserted postconditions of the execution of plan steps.

The apparatus 10 of the present invention preferably stores the software code for process 55 in ROM 14. Additional portions of the software code can also be stored in mass storage 22 or elsewhere. The apparatus for deducing user intent and providing computer implemented services therefore comprises a combination of hardware and software. As is well known to those skilled in the art, the dividing line between the hardware and the software is somewhat arbitrary and is, to a certain extent, up to the discretion of the system designer. Preferably, the apparatus 10 in accordance with the present invention comprises: a) a computation device; b) a memory device coupled to the computation device; c) an input device coupled to the computation device; d) a system for noticing a significant new event provided by the input device and to create a significant observation; e) a system for deducing intent from the significant new event and from the context in which the new event occurred; and f) a system for providing a service based upon the new event and the context. While the present invention is preferably implemented on pen-based computer system, it can also be implemented on other computer systems.

The following are a number of specific examples of deductive assistance according to the method 55 of FIG. 3. It should be understood that deductive assistance is not limited in scope to the following examples but, rather, is a framework within which many forms of user assistance can be provided.

EXAMPLE ONE—MEETING WITH ISAAC

In FIG. 2, a user has entered "ISAAC 10 AM TUESDAY" in note N(1). Step 58 of FIG. 4, determines that ISAAC matches at least one entry in the knowledge base. Step 60 of FIG. 5 creates an SO set, and enters ISAAC into the SO set as SO(1). In a similar fashion, 10 AM and TUESDAY get entered into set SO as SO(2) and SO(3). To this point, the process has not been delimited. Assuming the user then pauses, the process is delimited and the SO set is compared against the task templates. Since there are four task templates having <PERSON> (Scheduling, Mailing, Faxing, and Calling), a meaningful observation has been detected. Next, step 130 enumerates all possible intents (there are four of them) and calculates their relative weights. In this example, Scheduling has a weight of 75%, Mailing has a weight of −33%, Faxing has a weight of −42%, and Calling has a weight of −33%. As seen in FIG. 6B, if the variable THRESH is less than 75%, the hypothesis for the user intent is "Scheduling" having the plan "Meet." Next, in step 166, the preconditions for the plan Meet are filled with the values "ISAAC", "10 AM" and "TUESDAY" for <PERSON>, <TIME_SLOT>, and <DAY>, respectively. Since there are multiple frames which refer to by ISAAC, there is an ambiguity which is resolved by step 181. The <PLACE> slot is NULL because the user did not specify a place for the meeting. In step 168, the NULL precondition needs to be filled with a value before the plan can execute. For example, step 198 can ask the user where the meeting is to be held. Or, step 198 can default to the last place that the user met Isaac. Finally, the prepare to execute step 68 and the execute step 70 are executed to enter the appointment in the user's calendar.

EXAMPLE TWO—DRAWING AN ORGANIZATION CHART

FIG. 2 illustrates an organization chart drawn by a user with assistance by the process 55 of the present invention. With additional reference to FIG. 5d, the user draws four rectangles A, B, C, and D. Assume that a timeout has occurred after the fourth rectangle has been drawn. The SO set therefore includes four significant observations SO(1)–(4). This SO set is matched against the shape activated task templates of FIG. 5c, with the results shown in column 126. The weighting routine results in a hypothesis HYP=<HOR_ORG_CHART>. The plan associated with the task template for <HOR_ORG_CHART> preferably includes a number of plan steps useful in completing an organization chart. A first such plan step makes all of the rectangles A, B, C, and D the same size and shape. The second plan step aligns the rectangles B, C and D along a horizontal axis and provides equal spacing between them. A third step aligns rectangles A and C along a vertical axis and spaces accordingly. A fourth step can draw the organization chart lines as indicated by the broken lines in FIG. 5b. Note that this step may be optional based on user preferences.

EXAMPLE THREE—MATHEMATICAL CALCULATION

A user enters a mathematical formula as shown in FIG. 2. The process will assign SO(1)=0.04, SO(2)='x', SO(3)=√, SO(4)=2 and SO(5)='='. This SO set will match into a task template similar to the pattern template of FIG. 4c. A plan associated with the highest weighted task template will then perform the calculations indicated and provide the result to the right of the equals (=) sign.

EXAMPLE FOUR—RECEIVING A FAX

An example of opportunistic deductive assistance is the reception of an incoming fax. An incoming fax will create a significant observation SO(N) which is self delimiting, creating a delimited SO set. Alternatively, the incoming fax could be a single element in an opportunistic SO set, thereby preserving events SO(1)- −SO(N−1) a the user's SO set for subsequent processing. The SO set is then matched against the opportunistic lookup table of FIG. 4e to result in choosing the "receive fax" plan template. The receive fax plan template includes the plan steps of receiving and storing the fax using user preferences for the storage location, and alerting the user of the receipt of the fax depending on the user's current activity.

EXAMPLE FIVE—REMEMBERING DAD'S BIRTHDAY

Assume the user writes "Dad's Birthday" and provides an explicit delimiter, for example, by encircling the words or by selecting the words and pressing an "assist" button on keypad 23. This produces an SO set where SO(1)=Dad's and SO(2)=Birthday. This would match a task template similar to 112 of FIG. 5b. The plan steps associated with the selected template could, for example, look up Dad's birthday, place an entry in the user's to do list which is timed to give the user a reminder five days in advance of the birthday to buy a gift, and make an entry in the user's calendar of the day of the birthday.

EXAMPLE SIX—SENDING A FAX

Procedurally, sending a fax can be quite similar to example five above. Assume that the user writes "FAX BOB" over or near some text on the screen and then provides an explicit delimiter. The SO set would consist of the words "FAX" and "BOB". The plan steps associated with the task template which matches these significant observations can therefore prepare a fax cover sheet, lookup Bob's full name, address, and fax number, reformat the text into a form suitable for faxing, dial the fax number, and send the fax. These steps can carried out at a future point in time based on user's preference or explicit instruction.

EXAMPLE SEVEN—CONCENTRIC CIRCLE ALIGNMENT

A user draws a circle on the screen, which matches into the shapes look-up table 90 of FIG. 4d and is entered into the SO set as SO(1). The user then draws another circle substantially concentrically around the first circle. This second circle is entered into the SO set as SO(2). Next, there is a timeout or a spaceout to delimit the SO set. The SO set then is matched against the shape activated task template 120 and has a 67% match to <CONC_CIRCLES>. Assuming that this is above the threshold level, the associated plan then concentrically aligns the second circle with the first circle.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A computer implemented method for deducing user intent and providing computer implemented services comprising:
    (a) noticing a significant new event occurring within a computer system including:
        (i) noticing that there is a new event;
        (ii) matching said new event against a computer database of recognizable significant events;
        (iii) creating a significant observation from a match of said new event into said database;

(iv) recording a delimiter value with said significant observation; and
(v) adding said significant observation to a set of significant observations which have occurred within said delimiter value;

(b) deducing an intent from said significant new event and from the context in which said new event occurred including:

(i) recognizing a possible intent from the new event from the context in which the new event occurred; and (ii) determining a highest priority intent attributable to said new event in said context including:

(1) enumerating all possible intents from said new event in its context by matching said significant observations in said set against at least one template to determine all possible matches;

(2) prioritizing said possible intents by weighting said matches, said step of weighting said matches being accomplished by taking, for each template that there is at least one match, the ratio of a number of matching significant objects in said set to the number of positions in said template; and (3) choosing a highest priority intent from said prioritized possible intents; and (c) providing a service based upon said new event and said context.

2. A method of executing an operation on a computer system in response to high level information entered in the computer system, the method comprising the following steps:

recognizing as objects pieces of information entered on a display screen of the computer system, the objects each having a recognized object type, the object types recognized by the computer system including at least persons, shapes, and times;

creating a set of objects from the information entered in the computer system, the set describing possible computer operations;

comparing the object type of at least one of the objects in the set of objects so created with a plurality of task templates stored in the computer system, the task templates defining operations that can be performed with the computer system, the templates also having a plurality of associated preconditions;

identifying one or more of said task templates having a precondition corresponding to an object type of at least one of the objects in said set;

selecting a single task template from among the one or more task templates identified in the previous step by finding the task template having the best agreement with regard to the object types of all text or graphics objects in the set; and executing the task associated with the single task template if the preconditions associated with that template have been determined.

3. The method of claim 2 wherein said operations that can be performed with the computer system include at least one of faxing a document, mailing a document, scheduling on a calendar, arranging graphical objects on a display, calling another computer system, printing a document, finding an object, filing a document, calculating a mathematical result, and formatting a document.

4. The method of claim 2 further comprising the following steps:

identifying, from the set of objects, those objects having more than one instance in a database; and specifying a single instance of the object from the database for use in satisfying the preconditions of one or more of the task templates.

5. The method of claim 4 wherein the step of specifying a single instance includes a step of using a heuristic reasoning procedure in the computer system to select the single instance from among all instances of the object type.

6. The method of claim 4 wherein the step of specifying a single instance includes a step of querying a user to specify the single instance from among all instances of the object type.

7. The method of claim 2 wherein the members of the set of objects are specified by a user action on the computer system.

8. The method of claim 2 wherein the set of objects are specified such that the members of the set were entered in the computer system within a predetermined time or space of one another.

9. The method of claim 2 wherein the computer system is a pen-based computer system and the information entered on the display screen is input by the interaction of a pen with a display screen of the computer system.

10. The method of claim 2 wherein the step of selecting a single task template from among the one or more task templates previously identified includes a step of prioritizing the previous identified task templates by weighting the preconditions for which a corresponding object type has been found.

* * * * *